United States Patent
Sakura et al.

(10) Patent No.: US 6,724,376 B2
(45) Date of Patent: Apr. 20, 2004

(54) LED DRIVING CIRCUIT AND OPTICAL TRANSMITTING MODULE

(75) Inventors: Shigeyuki Sakura, Kawasaki (JP); Katsuji Kaminishi, Sendai (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 321 days.

(21) Appl. No.: 09/858,757

(22) Filed: May 16, 2001

(65) Prior Publication Data

US 2001/0043093 A1 Nov. 22, 2001

(30) Foreign Application Priority Data

May 16, 2000 (JP) ......................................... 2000-143530

(51) Int. Cl.[7] .............................. G09G 3/32; H03B 1/00; H01S 3/00; G09F 9/33
(52) U.S. Cl. .................... 345/204; 327/109; 372/38.07; 340/815.45
(58) Field of Search .............................. 315/169.3, 224, 315/241; 327/108, 109, 514; 372/38.02, 38.03, 38.07; 250/551, 552; 340/815.45; 345/46, 82, 204

(56) References Cited

U.S. PATENT DOCUMENTS

| | | | | |
|---|---|---|---|---|
| 3,968,399 A | * | 7/1976 | Jarrett | 372/383.02 |
| 4,571,506 A | * | 2/1986 | Lisco | 327/109 |
| 4,695,858 A | | 9/1987 | Takezawa et al. | |
| 5,097,145 A | * | 3/1992 | Hayashi | 327/109 |
| 5,343,323 A | * | 8/1994 | Lynn et al. | 398/182 |
| 5,589,786 A | * | 12/1996 | Bella et al. | 327/108 |
| 6,037,832 A | | 3/2000 | Kaminishi | |
| 6,049,175 A | * | 4/2000 | Forsberg | 315/200 A |
| 6,400,349 B1 | * | 6/2002 | Nagumo | 345/82 |

FOREIGN PATENT DOCUMENTS

| | | |
|---|---|---|
| JP | S62-59914 | 12/1987 |
| JP | H10-268954 | 10/1998 |
| JP | H11-103108 | 4/1999 |
| JP | 2000-22256 | 1/2000 |
| JP | 2000-228543 A | 8/2000 |
| JP | 2001-15854 | 1/2001 |

* cited by examiner

Primary Examiner—Steven Saras
Assistant Examiner—Paul A Bell
(74) Attorney, Agent, or Firm—Frommer Lawrence & Haug LLP

(57) ABSTRACT

An LED is an element in which when a voltage pulse applied to the intrinsic diode of an electrical equivalent model reaches a peak value, a current suddenly flows to obtain an optical output proportional to the forward current. By utilizing this property, the LED receives a rectangular voltage pulse having a large-current driving ability at a low output impedance, or a voltage pulse having two high levels. The low level of the voltage pulse is set within a voltage range where the extinction ratio of an output signal from the LED can be maintained. Even in an LED having a large internal capacitance, an increase in power consumption can be minimized, the transient response time can be shortened, high-speed modulation can be performed, and output light almost free from pulse waveform distortion can be obtained.

28 Claims, 14 Drawing Sheets

LED DRIVING CIRCUIT AND OPTICAL TRANSMITTING MODULE

CROSS-REFERENCE TO RELATED APPLICATIONS

This application is based upon and claims the benefit of priority from the prior Japanese Patent Application No. 2000-143530, filed May 16, 2000, the entire contents of which are incorporated herein by reference.

BACKGROUND OF THE INVENTION

The present invention relates to an LED intensity modulation type driving circuit for controlling emission/non-emission of an LED output in accordance with the high/low level of an input voltage pulse and, more particularly, to an LED driving circuit capable of outputting a high-speed modulated optical signal almost free from an emission pulse waveform distortion that is inevitable in optical data transmission of a high-speed optical data link.

Multimedia data, now widely-used and being increasingly developed, is typically exchanged over a variety of high-speed optical network backbones throughout the world. To be exchanged, optical transmitting and receiving modules play an important role as key components in optical communication systems of long-distance LAN connections, and short to mid-distance LANs supported by fiber-optic channels and Gigabit Ethernet. Purpose-built optical transmitting and receiving modules used in IT (Information Technology) systems currently in use have been developed at a cost, sacrificing versatility at the same time.

Recently, demands have arisen for a wide application range of optical interconnection techniques without limiting them to special applications such as high-performance optical communication and connection between computers, particularly server devices, in order to ensure connectability over long distances and high throughput even for exchange of data between multimedia devices such as home appliances, and to provide even end users with ease of use.

To meet these demands, IEEE 1394a extended from the electrical specification IEEE 1394 standardized in 1995 is further extended to optical applications, promoting standardization of IEEE 1394b which targets an optical data link using a POF (Plastic Optical Fiber) and is applicable to high-speed, low-cost, medium-distance connection. In the future IT field in a broad sense, practical performance is important as an interconnect requirements specification in addition to specifications which define basic transmission performance such as high throughput, regardless of the optical or electrical transmission signal form.

Strong electrical demands have arisen in terms of system mountability so as to realize low power consumption without cooling, have the same electrical interface as that of another IC used in an IT device, and if possible, obtain characteristics which allow operation at the same power supply voltage. Much lower cost than a conventional optical transmitting module is required in terms of cost performance.

The standard draft IEEE 1394b under examination adopts a gradient index plastic optical fiber having a large core system in order to reduce the cost of an optical fiber for use, simplify the internal structure, and reduce the cost of an optical link module itself. An example of this plastic optical fiber is combined with a red light source which falls within the low-loss wavelength region of the fiber.

The light source of the red wavelength region is a light-emitting diode (LED) which emits light in a wavelength region around 650 nm, or an optical semiconductor laser (LD) which oscillates at 650 nm. Of these light sources, the LD must be employed in terms of essential element response characteristics in high-speed S800 or more which is considered to be the mainstream of the optical data link as the technique to be established in the near future.

On the other hand, low-speed standards S100 to S400 will mainly adopt LEDs which can simplify the circuit arrangement and optical coupling system of an optical transmitter that are important factors for reducing the module cost.

In fact, products using LEDs as light sources are commercially available and widely used in an optical data link of several ten Mb/s or less that targets audio and FA systems.

FIG. 2 is a basic block diagram showing a conventional optical transmitting circuit.

As shown in FIG. 2, a constant current pulse prepared by ON/OFF-modulating, using a transistor switch, a DC current generated by a constant current source is generated, and the output is applied to a load LED. This method does not pose any technical problems in a low-speed link, up to about 10 Mb/s. In general, however, the switch response characteristic of an optical signal is low due to a large internal capacitance of a device that is a property unique to the LED. The low response characteristic determines the optical data link speed.

As one effective solution for relaxing this constraint, a peaking pulse current in phase with a constant current pulse is superimposed on an ON/OFF-modulated driving constant current pulse in synchronism with level inversion of the driving current switch, thereby accelerating the transient response of the LED.

If the means for compensating for and accelerating low-speed response characteristic is added, the original transmission data rate is as low as several tens of Mb/s, and the essential time constant which determines the device speed unique to the LED is as short as several ns or less. In addition, the signal processing speeds of photoelectric conversion and logic level conversion after optical transmission are substantially negligible with the development of the IC process technique. Optical transmission can be realized in which the signal error rate in data transmission is suppressed to be low so as not to cause any practical problems.

However, if optical transmission in which the transmission bit rate is increased to 100 Mb/s or more is to be realized by an LED along with the recent demands described above, the conventional method cannot be simply extended or applied.

As shown in FIG. 1, one of the present inventors has proposed a method capable of transmitting data at around 100 Mb/s by adopting the principle of current peaking driving, devising peaking superimposition, and decreasing the LED driving amplitude.

More specifically, a current bias required for an LED to generate an ON light intensity is always supplied from a DC constant current source to the LED anode. A CMOS buffer converts an external pulse signal input Vp into a rectangular pulse which changes at a low impedance between power supply voltages Vdd and Vss. A bias current input to the LED anode is ON/OFF-modulated by using the pulse. At the same time, a differential current flowing through a capacitance Cp is superimposed and supplied as a peaking current to the LED anode.

A method using an inductor instead of current peaking using a capacitance has also been proposed. The circuit shown in FIG. 1 that is driven by a conventional constant current switch is used as a main arrangement. A circuit constituted by series-connecting an inductor and resistor is parallel-connected to an LED, and they are driven as the entire load of the current output in place of using only the LED as a load. That is, a peaking current is generated by the inductor in transition and supplied to the LED.

Adding the means for superimposing the peaking current can shorten the transient response time of an output optical signal to some extent. However, effective peaking superimposition inhibits a peaking pulse from completing attenuation within the signal pulse width because of the time constant. A pulse tail or the like is generated, and the bit rate cannot be so increased. Further, the output optical pulse width essentially becomes smaller than the driving pulse width of an electrical signal.

The optical pulse width decreases by 1 ns or more in general, and in some cases by 10 ns, which depends on the LED driving circuit method. These values cannot be ignored when the minimum pulse width of a transmission optical signal is 10 ns or less. The decrease causes great variations in the ON/OFF pulse duty ratio of the transmission signal or additional increase in time jitter, seriously influencing the transmission waveform quality.

The phenomenon that an output optical pulse becomes narrower than a driving pulse input to an LED results from a property unique to a device in which an LED generates light almost proportionally to a forward current flowing through the diode. The electrical equivalent circuit model of the diode is expressed by a structure as shown in FIG. 24 in which a current flows through a series resistance Rs of the diode and a p-n junction diode capacitance Cd is parallel-connected to a constant current source Id.

An output current If from the constant current source Id depends on an intrinsic diode voltage Vd applied across Id or Cd. Letting Is be the saturation current of diode junction, N be the radiation coefficient, $Vt=kT/q$ (k: Boltzmann constant, q: electron charge) be the thermal electromotive force with respect to an operation temperature T of the p-n junction, the first approximation is given by $If=Is \times exp[Vd/(N \cdot Vt)]$.

When the voltage Vd applied to the LED is a forward or reverse bias voltage which does not cause the LED to emit light, Cd increases depending on the voltage Vd, and substantially exhibits a value dominated by the p-n junction capacitance Cj. Under the operation condition where the LED emits light, the transition time capacitance component which increases in proportion to the forward current If is added.

A general LED has Rs of several $\Omega$ to several tens of $\Omega$ and has a value of several ten pF to several hundred pF only by Cj in zero bias. Thus, even when an ideal rectangular pulse Vh is input to the LED, as shown in FIGS. 25A and 25B, the internal intrinsic diode voltage Vd changes by an exponential attenuation function with a time constant (Rs·Cd) of a little less than 1 ns to about 10 ns, and exhibits a waveform which is asymptotic to a steady-state value Vhigh upon the lapse of time. The forward current If exponentially increases with respect to Vd, as represented by the above equation. The forward current If reaches the same current value as the steady-state value only when the forward current If falls within (N·Vt) with respect to the value Vd at which a desired maximum steady-state current is obtained, e.g., comes near to, e.g., 30 mV to 50 mV.

In other words, for a rectangular pulse externally input to the LED, a current starts flowing when the voltage reaches a peak value, and the LED outputs an optical output in proportion to the forward current value flowing through the LED. At the pulse leading edge, the rise of the emission pulse greatly delays from the input rectangular pulse. At the pulse trailing edge, the fall of the pulse hardly delays because the current flowing through the LED abruptly decreases when the voltage drop of Vp applied to the intrinsic diode reaches several ten mV. The difference between the delay times in transition makes an optical output pulse width smaller than an input electrical pulse signal.

If a peaking current is superimposed, like the prior art, in order to decrease the signal delay of the transient response, the charge/discharge time with respect to Cd can be shortened to shorten the delay time. Generally in superimposition of a peaking current, a current exceeding the steady-state peak value of If necessary for obtaining an optical signal amplitude is supplied. Current consumption in operation increases, and the optical output waveform itself has peaking and deforms from the rectangle. Consequently, the discrimination level of the high-speed receiving circuit varies, and the time jitter of a reception output signal increases.

To the contrary, an LD used in high-speed optical communication can obtain laser oscillation by limiting the space area to a narrow one within the element and realizing a region having a large optical amplification gain. The total area occupied by the element itself to be substantially operated suffices to be small. The unique capacitance value of the element is 10 pF or less at most.

As for an LD output, a large optical output can be obtained with high photoconversion efficiency in proportion to the difference from the threshold of an injection current to the element at the boundary of a current having a given threshold or more. It is, therefore, effective to turn on/off a constant current source as a reference at a high speed and convert a current into a current pulse. This method has been applied to most LD driving circuits.

Especially, high-frequency characteristics can be relatively easily ensured because the LD can employ a normal high-frequency circuit technique in which even when the output terminal of a current switch circuit and the LD are apart from each other, they are connected via a transmission line of 50 $\Omega$ to match all impedances. To the contrary, the LED can always obtain an optical output proportional to an input current regardless of the magnitude of the injection current, but is essentially difficult to realize high-frequency modulation using an electrical signal because a large capacitance is added.

BRIEF SUMMARY OF THE INVENTION

It is an object of the present invention to provide an LED driving circuit capable of shortening the transient response time, realizing high-speed modulation, minimizing an increase in current consumption, and obtaining output light almost free from the pulse waveform distortion of an emission signal by a new driving method based on an operation model even in an LED having a large internal capacitance as a unique device characteristic, and an optical transmitting module capable of realizing low power consumption, low cost, and high-speed transmission by using the LED driving circuit.

An LED driving circuit according to the present invention comprises a voltage generation circuit for generating a first output voltage of a low level and a second output voltage of a high level, a first MOS switch for transferring the first output voltage to an output terminal, a second MOS switch for transferring the second output voltage to the output terminal, and a pulse generation circuit for shaping a waveform of an externally input signal and generating first and second rectangular pulses having a complementary relationship, wherein an LED is electrically connected to the output terminal, the first rectangular pulse is input to a gate of the first MOS switch, the second rectangular pulse is input to a gate of the second MOS switch, the high level is determined by a forward peak current or forward voltage of the LED which is necessary for outputting light of a predetermined intensity from the LED, and the low level is set to a voltage value for changing an emission intensity of the LED to zero or a negligible value.

An LED driving circuit according to the present invention comprises a voltage generation circuit for generating a first output voltage of low level, a second output voltage of a first high level, and a third output voltage of a second high level which is higher than the first high level, a first MOS switch for transferring the first output voltage to an output terminal, a second MOS switch for transferring the second output voltage to the output terminal, a third MOS switch for transferring the third output voltage to the output terminal, and a pulse generation circuit for shaping a waveform of an externally input signal and generating first, second, and third rectangular pulses, wherein an LED is electrically connected to the output terminal, the first rectangular pulse is input to a gate of the first MOS switch, the second rectangular pulse is input to a gate of the second MOS switch, the third rectangular pulse is input to a gate of the third MOS switch, after the third rectangular pulse changes to the high level, the second rectangular pulse successively changes to the high level, the first rectangular pulse has a complementary relationship with an OR value of the second and third rectangular pulses, and a high-level voltage applied to the LED is binary.

An optical transmitting module according to the present invention comprises an IC having the above-described LED driving circuit, an LED connected to an output terminal of the LED driving circuit, a submodule on which the IC and the LED are mounted, an optical connector which is optically coupled to the LED, a lead which is electrically coupled to the IC and the LED, and a package for housing the IC, the LED, the submodule, the optical connector, and the lead.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An LED driving circuit and an optical transmitting module of the present invention will be described below in detail with reference to the accompanying drawings.

As described above, the phenomenon that an output optical pulse becomes narrower than a driving pulse input to an LED is caused by a property unique to a device in which an LED electrically operates as a diode and outputs a light intensity almost proportional to a forward current flowing through the diode.

Figure 24:
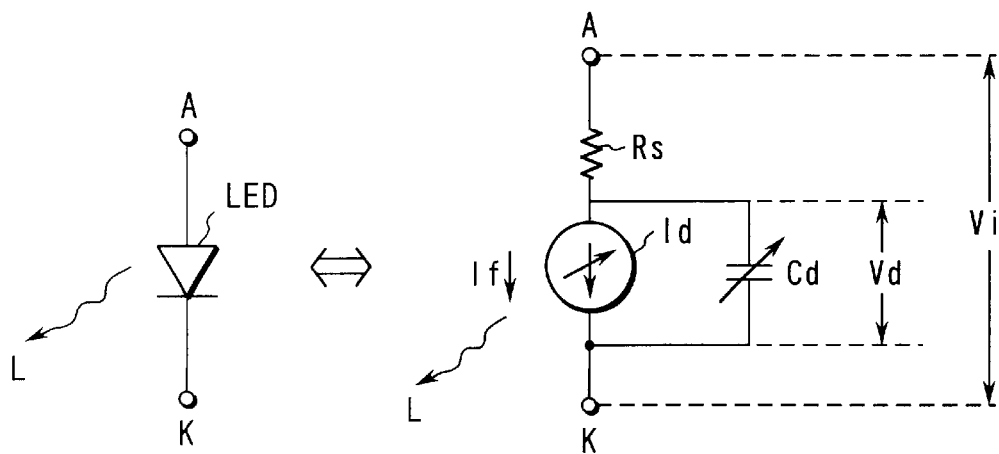
FIG. 24 is a circuit diagram showing the model of an LED electrical equivalent circuit.

An equivalent circuit model representing the electrical characteristics of the LED is shown in FIG. 24. The forward current If generated by the constant current source Id in proportional to an optical signal is determined by the internal voltage Vd applied to an intrinsic diode, and is given by equation: $If = I_s \times \exp[Vd/(N \cdot Vt)]$. Once the device and operation conditions are determined, If depends on only Vd and exponentially increases.

If increases to the same order as a desired current value corresponding to a "high" optical signal when If falls within several times of $(N \cdot Vt)$ around the peak value Vhigh which Vd finally reaches, e.g., falls within a voltage range lower by about 100 mV than the peak value Vhigh. That is, when the voltage pulse Vd applied to the intrinsic diode comes very close to the peak value, a current abruptly flows, and an LED optical output proportional to the forward current is obtained. Hence, the technical key point of an LED driving circuit for obtaining a high-speed optical signal is to modulate a voltage waveform around the peak value Vhigh of Vd at a high speed.

Most LEDS have Rs of several Ω to several tens of Ω and have a value of several ten pF to several hundred pF only by the junction capacitance Cj in zero bias. In general, Cj depends on Vd and increases in the forward bias voltage region. Under an operation condition where the LED emits light, the transition time capacitance component which increases in proportion to If is added to the total diode capacitance Cd. An actual element capacitance value was measured to find that the Cd value was about twice or less the Cj value under an emission condition.

As described above, the voltage which dominates the emission characteristics of the LED is around the peak value of Vd. In the following description, therefore, the Cd value is fixed to the peak value of Vd. The result derived based on this approximation is almost the same as a numerical analysis simulation result based on an actual device mode, so the gist of the contents of the present invention described below will not change.

A capacitive load of about 100 pF can be effectively driven by a high-speed rectangular pulse waveform by using a voltage pulse generation source having an output impedance smaller than the impedance of the load that is smaller in the high-frequency region. Especially when the series resistance Rs is lower than the impedance of Cd at the bit rate frequency of a transmission signal, ideal rectangular pulse driving can be realized by directly applying a rectangular voltage pulse to the LED.

More specifically, an externally input pulse is shaped into a rectangular pulse, and a rectangular voltage pulse which changes to a high level the voltage Vhigh having a value corresponding to Vd at which If necessary for causing the LED to emit light at a desired luminance is obtained is generated, output, and applied to the external load LED. In the final pulse output circuit, its output impedance is desirably set to ⅕ or less the Rs value. The low level value Vlow of the output voltage pulse is set to 0V or more equal to ground to which the cathode of the LED is connected, and to a voltage corresponding to a forward current of 1 μA or less at which emission of the LED can be ignored in the entire operation temperature range, e.g., to 1.4V or less for a 650-nm LED.

When the Rs value cannot be ignored in comparison with the bit rate frequency of a transmission signal, the rise waveform of Vd is limited by the RC time constant of the series resistance Rs and total diode capacitance Cd of the LED even by driving with the rectangular voltage pulse. The limited amount depends on an LED element for use, and the value of the time constant Rs Cd varies from 1 ns to 20 ns.

Figure 25A:
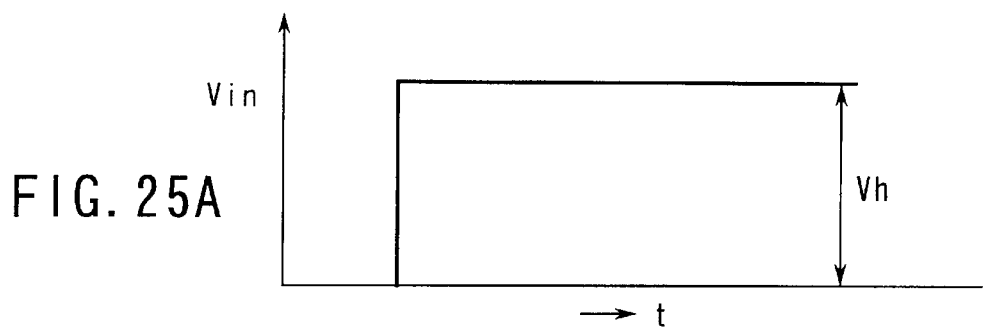
FIGS. 25A and 25B are graphs each showing the voltage response characteristic of an intrinsic diode when an LED is driven by a constant rectangular voltage pulse.
Figure 25B:
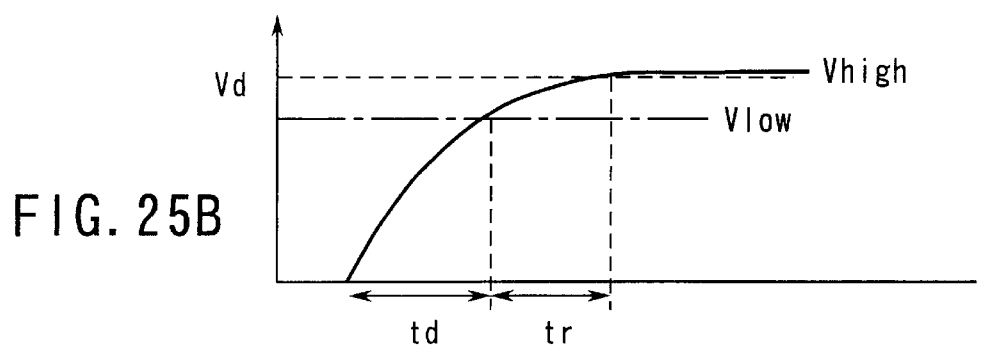

Even if the LED driving circuit outputs an ideal rectangular pulse, as shown in FIGS. 25A and 25B, a change in intrinsic diode voltage Vd in the LED responds as a time change waveform asymptotic to the steady-state value Vhigh by an exponential attenuation function determined by the time constant. A current starts flowing through the LED to cause emission only when Vd reaches 100 mV with respect to Vhigh. Hence, a delay time td several times the time constant is spent from the leading edge of an input pulse.

In this manner, the maximum value of a bit rate allowing transmission is determined not by the transient response time of the driving circuit itself but by the time constant of the element. The rise of an emission pulse greatly delays from an input rectangular voltage pulse at the pulse rise portion, whereas no large delay occurs at the fall of the input voltage pulse in comparison with the rise because a current flowing through the LED abruptly decreases when the application voltage of the intrinsic diode drops and reaches several tens of mA with respect to the peak value Vhigh. The rise delay cannot be ignored, but the fall delay can be substantially ignored. As a result, the pulse width narrowing phenomenon occurs even when high-speed operation is enabled by adopting a driving method with a rectangular voltage pulse.

When the maximum transfer bit rate is insufficient only by simple driving with a rectangular voltage pulse or the pulse width narrowing phenomenon cannot be ignored because the series resistance Rs cannot be ignored, a new means for shortening the rise time of Vd in the LED and shaping the waveform of Vd close to a rectangle is introduced. As for the output impedance of the LED driving circuit, selecting a smaller RS value is a condition of obtaining an improved result. The impedance which limits charge/discharge of Cd is mainly RS. Under these conditions, two improvements are proposed.

According to the first method of making the intrinsic diode voltage Vd close to the pulse peak value Vh at the pulse rise, the low level value Vl of the pulse voltage applied to the LED is controlled. That is, when the flow of electric charges which raise the capacitive load is limited, the charge time is shortened by decreasing the voltage difference to be changed from the beginning.

More specifically, the voltage is set to be lower than a forward voltage which gives a current value obtained by dividing If which gives high-level output light by an extinction ratio required for an LED output optical signal, and to be as high as possible within a voltage range where the low level value of a repetitive optical output pulse signal at the maximum frequency can ensure a value twice or less the low level value of a low-speed repetitive optical pulse signal. Resultantly, the voltage pulse amplitude for driving the LED is minimized, the charge amount necessary for charging/discharging Cd is minimized, the driving current is suppressed, and power consumption is secondarily reduced.

According to the second method of making Vd close to the pulse peak value Vhigh quickly at the pulse rise, a current injected to Cd is increased. Since the impedance which limits charge injection is fixed to Rs, the voltage applied across Rs, i.e., voltage applied to the LED is set higher than Vh in the initial time of pulse transition. The pulse waveform output to the LED deforms from a rectangular shape which keeps an ideal constant high level, and the LED is driven by a voltage pulse of a waveform having two high level values. A high-level application voltage is set to a voltage Vh2 higher than Vh during a predetermined period after the start of the pulse leading edge until the voltage Vd reaches Vh. When Vd reaches an intended steady-state value Vh, the high-level voltage value Vh1 returns to the prescribed value Vh and keeps constant at Vh during the remaining high-pulse period.

The period during which the voltage is set as high as Vh2 after the pulse rise suffices to be 5 ns or less, and an increase (Vh2−Vh1) in amplitude is 1V or less. Their optimal set values are ideally determined such that Vd is equal to Vhigh, and instantaneously when Vd exceeds Vhigh, Vh switches from Vh2 to Vh1. Although a slight overshoot appears at the leading edge of an optical output pulse in practice, the values are determined based on those immediately before overshooting. Vd is set smaller in width and amplitude than the rectangular voltage pulse, and the maximum peak current is 10 times or less the steady-state value of If.

As a result of this setting, charge injection at the pulse edge is basically accelerated, and an optical signal is free from any overshoot in principle. The eye pattern waveform distortion of an output optical pulse is minimized, a redundant circuit current is also suppressed, and power consumption is suppressed, to be low.

As a modification of these methods, 20% or more of an overshoot is applied to the output pulse characteristics of the LED driving circuit such that the output pulse acts equivalently to a binary voltage pulse which effectively accelerates charge injection at the pulse edge. That is, the LED driving circuit is basically a driving circuit which outputs the two voltages Vl and Vh at a low impedance, and also serves as a pulse output amplifier which flattens the gain at a low frequency, and in frequency bands three and five times the basic frequency of the maximum bit rate, sets the gain larger than the flat gain at a low frequency.

In the above description, the two independent methods of shortening the rise time including the delay time are separately applied. These two methods can also be combined and simultaneously used. The combined method can more effectively shorten the delay time and increase the transient response speed. Power consumption is minimized, and an optical output having a high transient response speed almost free from waveform distortion is obtained.

If the pulse narrowing phenomenon still causes a signal transmission error even after applying any of the above means, a circuit for compensating for the pulse width by the narrowing amount is added. The LED driving voltage pulse is shaped to attain the same width as that of an input signal pulse. To the contrary, the modified LED driving circuit generates a pulse which is widened by a value for compensating for a high-level pulse width by using a logic circuit, on the basis of a pulse prepared by temporarily shaping an externally input signal waveform, and generates a voltage pulse based on the widened pulse. In fact, a high-speed LED driving circuit can sufficiently compensate for a narrowed pulse by widening the pulse by 2 ns or less.

The LED is a diode having a large electrical band gap, and its electrical characteristics have temperature dependence unique to the diode. To keep the optical signal characteristics of the LED constant, if forward bias voltage changes the forward current of the diode must not differ, even upon a temperature change. Vh and Vl which determine the driving voltage pulse and level are controlled following the temperature dependence of the forward voltage of the LED.

An identical LED is used as a voltage reference or an Si diode having the same radiation coefficient N as that of the LED is selected and used as a voltage reference, and the voltages Vl and Vh are generated while the temperature dependence is compensated for. To complete the Si diode by only the process of manufacturing an LED driving circuit IC, the temperature characteristics of the Si diode can be made to coincide with those of the LED by properly amplifying a change in the forward voltage of the Si diode in the process and synthesizing the amplified value with a predetermined value because the temperature change of the Si diode is often slightly smaller than the temperature change of the LED and the forward voltage of the LED is higher.

The method of fixing circuit constants in the IC cannot cope with flexible application to various LEDs in order to use the LED driving circuit as a general-purpose component. In this case, temperature characteristic data of an LED used in an EEPROM is written/held, and a follow-up voltage is generated by a D/A converter which adopts the forward voltage of the Si diode as a reference voltage by using the data.

In principle, the emission efficiency of the LED with respect to the current has a negative temperature coefficient. A decrease in optical output pulse amplitude can be compensated for by setting the temperature coefficient of Vh to be smaller than that of Vl. Furthermore, an intensity monitor photodetector is arranged near the LED, and a feedback circuit for controlling the average output of the intensity monitor signal to hold a predetermined value is arranged. Accordingly, the quality of a transmission optical signal upon a temperature change can be kept more constant.

The present invention will be explained in detail according to preferred embodiments with reference to the accompanying drawings.

For quantitative definiteness of the description, the following selected parameters and operation conditions of the electrical equivalent diode model of the LED will be exemplified as typical numerical targets.

Assume that Rs is 10 Ω, the average value of Cd around the emission point is 200 pF, the steady-state value of the forward peak current If at the emission point for a high-level pulse is 20 mA, the value of the forward voltage Vd at which this current is obtained is Vhigh, and the extinction ratio of an output optical signal is 20 or more. These relatively strict device parameters and driving conditions are necessary in order to realize a high-speed optical data link.

A low-level forward current at which the extinction ratio of an optical signal is 20 with respect to a forward current of 20 mA, at which the optical output signal is at high level, is 1 mA. Further assume that the forward voltage Vd=Vlow at this time is 1.9V, and the thermal electromotive force (N·Vt) is 50 mV. The relation with the forward current of the diode is calculated by using these numerical values to find that the forward voltage value Vhigh necessary for obtaining If=20 mA is 2.05V.

Since the voltage drop by Rs is 0.2V at a forward current of 20 mA, the voltage Vh corresponding to the sum of the voltage drop and forward voltage value that should be externally applied between the anode and cathode of the LED must be 2.25V.

Figure 1:
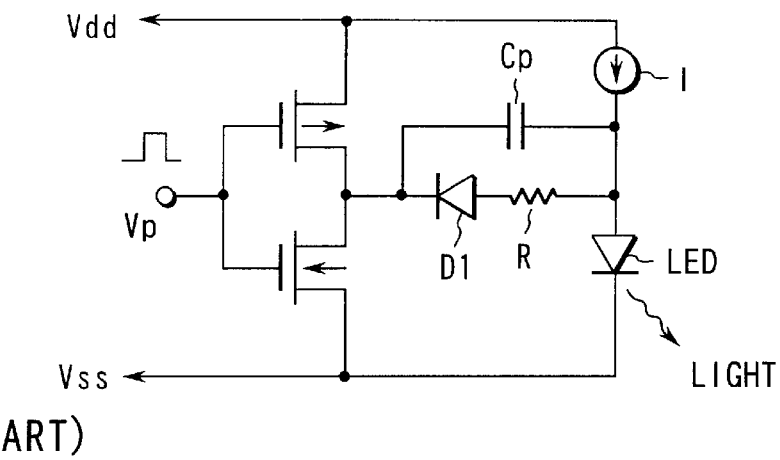
FIG. 1 is a circuit diagram showing a conventional high-speed LED driving circuit.
Figure 2:
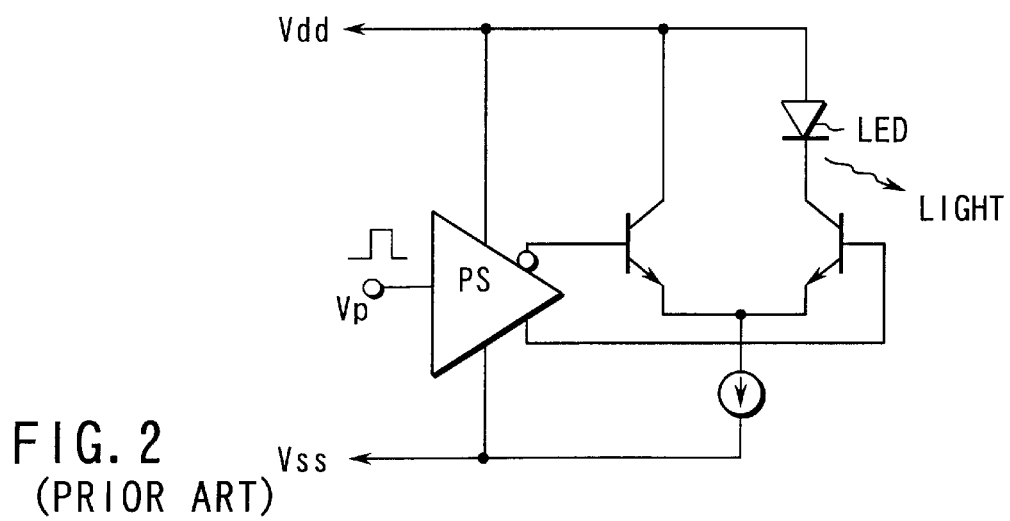
FIG. 2 is a circuit diagram showing a conventional LED driving circuit.
Figure 3:
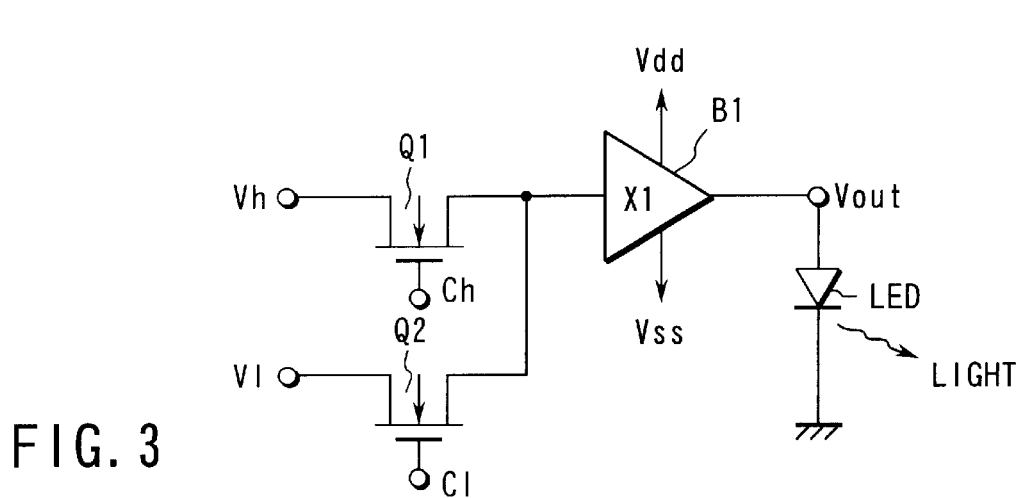
FIG. 3 is a circuit diagram showing an LED driving circuit for generating a rectangular voltage pulse by a small-signal MOS voltage switch, amplifying the pulse by a buffer, and outputting the amplified pulse.

FIG. 3 shows the first embodiment of a circuit for driving an LED by the basic rectangular voltage pulse of the present invention.

This circuit is an LED driving circuit in which two inputs, i.e., the reference voltage Vh which determines the high level of a pulse and Vl=0V which determines its low level are switched by small-signal MOS voltage switches Q1 and Q2 in accordance with a control timing pulse, received as rectangular voltage pulse generation signals, amplified by a high-speed buffer, and output.

Figure 4:
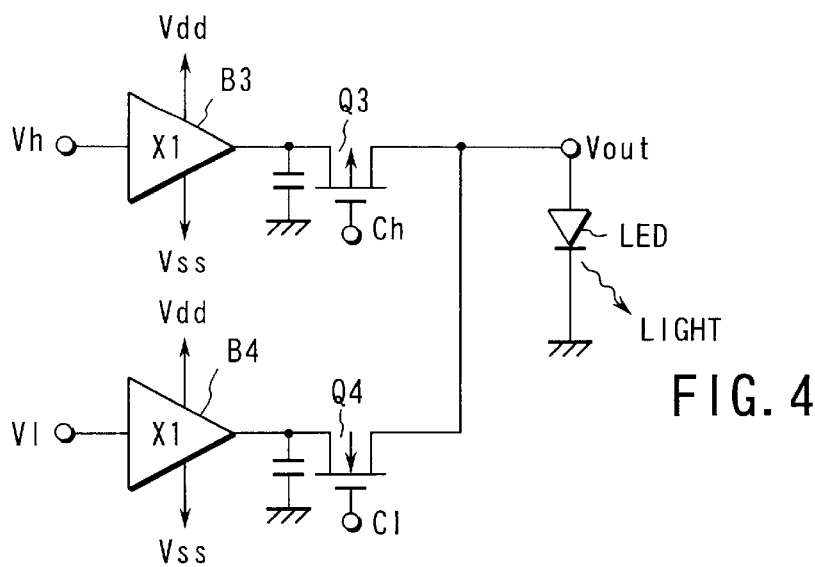
FIG. 4 is a circuit diagram showing an LED driving circuit for directly switching a buffer-amplified reference voltage by a MOS switch and generating a rectangular voltage pulse.

FIG. 4 shows the second embodiment of the circuit for driving the LED by the basic rectangular voltage pulse of the present invention.

In the second embodiment, unlike the first embodiment, a reference voltage is temporarily amplified by a buffer so as to hold a predetermined voltage even with a large output current load, and then the voltage is directly switched between power MOS switches Q3 and Q4 and directly output to an LED to drive the LED by the rectangular voltage pulse.

To electrically drive a large capacitive load at a high speed by a rectangular pulse, an output circuit for driving the LED load must have an output impedance lower than Rs by one order of magnitude, e.g., 1 Ω or less in the above-mentioned conditions, and must have an ability capable of discharging a peak current of about 100 mA at maximum.

Figure 7:
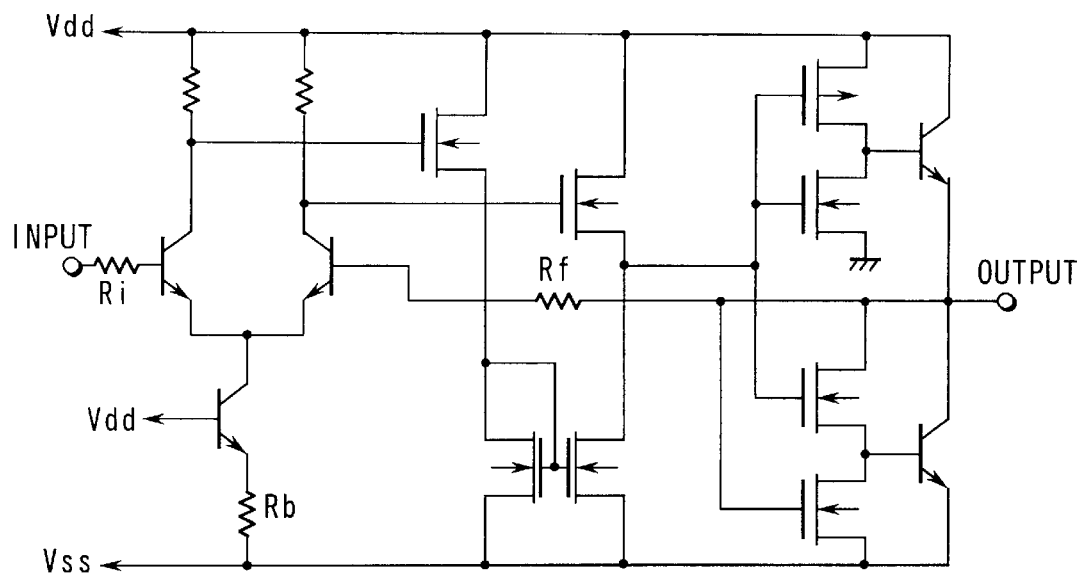
FIG. 7 is a circuit diagram showing the first embodiment of a high-speed buffer amplifier using a Bi-CMOS circuit.
Figure 8:
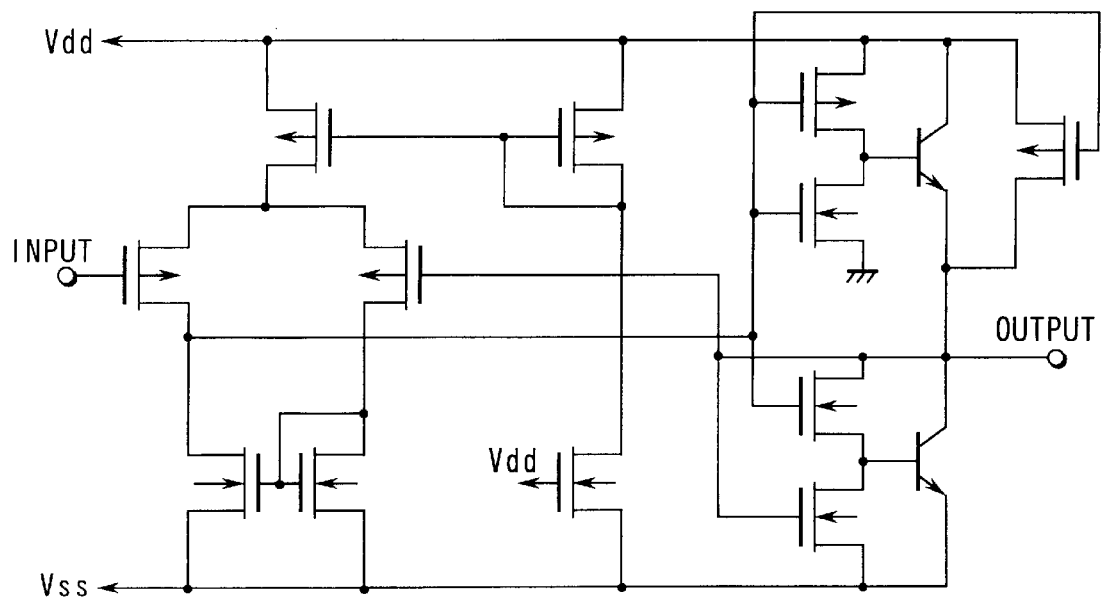
FIG. 8 is a circuit diagram showing the second embodiment of a high-speed buffer amplifier using a Bi-CMOS circuit.
Figure 9:
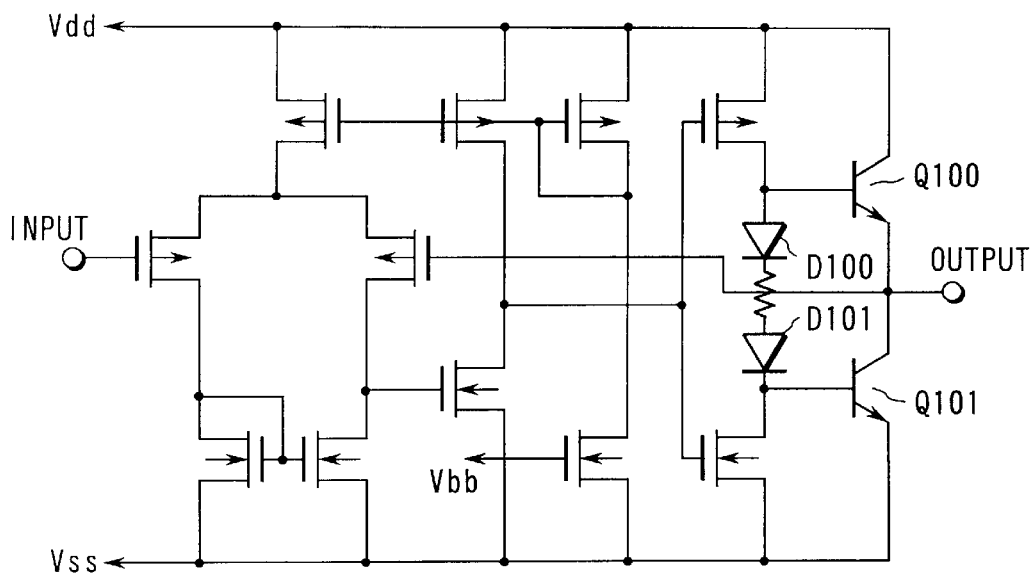
FIG. 9 is a circuit diagram showing the third embodiment of a high-speed buffer amplifier using a Bi-CMOS circuit.

Detailed circuits of a high-speed buffer amplifier with a gain of 1 which satisfies these requirements are shown in FIGS. 7 to 9. FIGS. 7 to 9 show circuits which are manufactured by the Bi-CMOS process, can operate with a large amplitude even in low power supply voltage operation, and have a wide band characteristic of several hundred MHz and a high current driving ability of 100 mA or more.

The embodiment of FIG. 7 is a high-speed buffer amplifier circuit which exploits a differential amplifier made up of bipolar transistors as an input circuit and can reduce noise with a small input/output offset voltage error. The maximum output voltage is limited to a voltage lower than Vdd by about 0.8V, which does not pose any problem when the LED of an n-type substrate is used by grounding the cathode. However, a problem arises when the power supply voltage for use is low and an operation condition in which the difference between Vdd and Vh is 1V or less is required. Under the limitations on the input circuit, the lowest voltage of Vl is limited to about 1V or more.

To eliminate the limitations on the input/output voltage operation range of the circuit shown in FIG. 7, a differential amplifier circuit having a large in-phase input voltage allowable range is employed as the input circuit, and a pull-up circuit to Vdd is arranged in the output circuit.

This embodiment relates to a high-speed buffer amplifier shown in FIG. 8.

Since the input stage uses a differential input circuit made up of P-channel MOS transistors (P-MOS), the amplifier can operate within the input range of 0V to (Vdd−0.5V). To make the output voltage close to Vdd, a P-MOS is parallel-connected to an npn transistor on the Vdd side. After the transistor is saturated, the MOS transistor pulls up the output voltage toward Vdd, thus realizing a high speed, high current drivability, and high output voltage.

The design according to an actual process results in a smaller band width than the embodiment of FIG. 7. Further, this buffer amplifier suffers demerits such as the possibility of generating an offset error from a set input value of mV order, but can operate by fully using the voltage between Vdd and ground regardless of the input signal level, the form of the output load, and the voltage.

The output circuits of the embodiments shown in FIGS. 7 and 8 tend to increase in high-frequency output impedance and be susceptible to noise fluctuations of a power supply or the like because the bias current of an output bipolar transistor becomes almost 0 in balanced-point operation in which the input and output are balanced.

An embodiment of a high-speed buffer amplifier shown in FIG. 9 is designed based on that shown in FIG. 8 in order to overcome the drawback.

This circuit is supported by high-speed pnp transistors as a process prerequisite. A bias current always flows through output transistors Q100 and Q101 through diodes D100 and D101 and a resistor R100, and the output circuit achieves class "AB" operation. By optimizing the bias current, the operation cutoff frequency of the output transistor can always be held around the maximum cutoff frequency of the transistor. High-frequency characteristics of the entire buffer circuit and a constant transient response regardless of operation conditions could be maintained.

The driving circuits of the first and second embodiments require pulses Ch and Cl for controlling MOS switches, in order to sequentially switch the reference voltage by MOS switches in accordance with an externally input pulse signal Vp, sequentially control the output pulse voltage level, and obtain a rectangular voltage pulse.

Figure 10A:
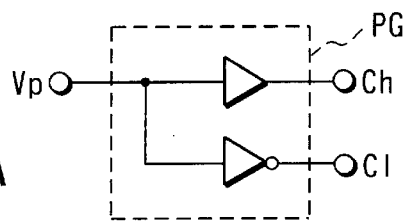
FIG. 10A is a circuit diagram showing the switch-controlled pulse generation logical circuit of a single-value rectangular pulse driving circuit.
Figure 10B:
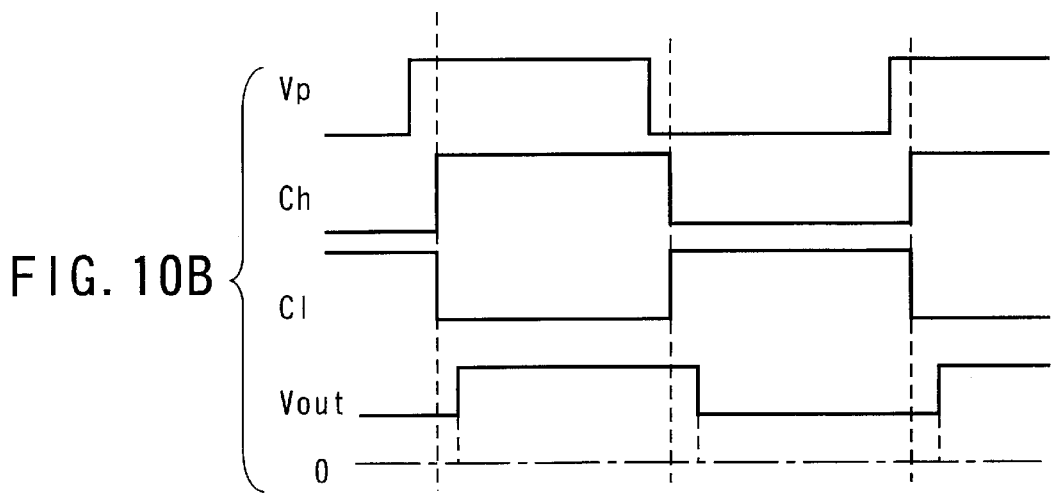
FIG. 10B is a waveform chart showing the timing waveform of the circuit in FIG. 10A.

FIGS. 10A and 10B show the sequence and timing waveforms of various signals required for the control pulses.

A circuit PG for generating the pulses Ch and Cl is constituted by a simple logical circuit shown in FIG. 10A. The timing waveforms of various signals and the waveform of an output voltage Vout are illustrated as ideal step responses with an added delay time on the assumption that a circuit signal delays. The waveform of the voltage output Vout corresponds to a chain line waveform because Vl is 0V in this embodiment.

Figure 26A:
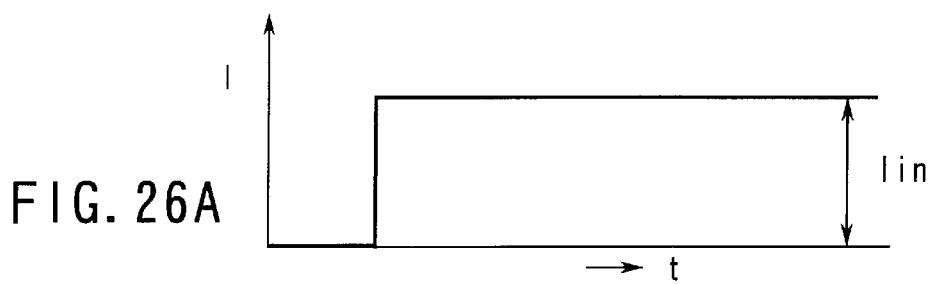
FIGS. 26A and 26B are graphs each showing the voltage response characteristic of an intrinsic diode when an LED is driven by a constant rectangular current pulse.
Figure 26B:
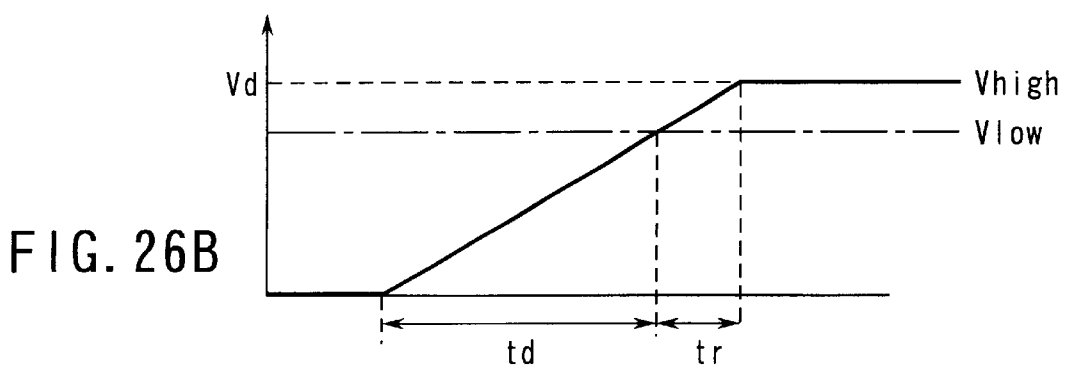

Prior to the description of a case wherein the low level value Vl of a voltage pulse applied to the LED is 0V, driving with a conventional constant current pulse will be examined as a comparison. When a constant current pulse having an amplitude of 20 mA is input to the LED, the temporal change of Vd responds by a function of linearly increasing Vd until Vd reaches the peak voltage Vhigh of the final steady-state value, as shown in FIGS. 26A and 26B.

The forward current which exponentially increases with time along with the linear rise of the voltage, i.e., the rise operation waveform of the optical signal was quantitatively examined to find that the delay time td until the current reached 5% of the maximum current amplitude was 19.0 ns, and the time until the current reached 90% of the forward current, i.e., the rise time tr of the optical output signal intensity was 3.5 ns.

In driving with a rectangular voltage pulse according to the present invention instead of driving with a conventional constant current pulse, the rise waveform of Vd is expressed by an exponential attenuation function determined by the time constant (Rs·Cd) and is asymptotic to the final value Vhigh, as shown in FIGS. 25A and 25B. According to the simulation results obtained when a constant voltage rectangular pulse having an amplitude of 2.25V was input to the LED, the delay time td was 3.7 ns, and the rise time tr was 5.3 ns.

The numerical values of the simulation results by the two different driving methods are compared to find that the time until the voltage reaches the steady-state emission level of the LED, as the sum of the delay time and rise time from the input level change start of a voltage pulse, is half or less in driving with a constant voltage pulse in comparison with driving with a constant current pulse. Constant-voltage driving is more advantageous than high-speed modulation.

Although the transient response time becomes shorter, the total time until the voltage reaches a steady-state value is still 9.0 ns. Even if the characteristic parameter value is slightly relaxed to make element characteristics be suitable for high-speed operation, the element capacitance Cd is halved to 100 pF, and RS is halved to 5 Ω, the implementation range of an optical transmittable bit rate is limited to a medium speed range of 100 Mb/s or less.

To realize higher-speed modulation operation by using an LED having the same characteristics as those described above, the low-level voltage Vl is not decreased to 0 but is always kept at a predetermined DC bias voltage.

An embodiment of the basic circuit arrangement is almost the same as the circuit diagrams shown in FIGS. 3 and 4, and the input reference voltage Vl is set to not 0V but a predetermined DC bias voltage. The switch control logical circuit is also the same as those shown in FIGS. 10A and 11A, and the pulse timing waveforms are also the same as those shown in FIGS. 10B and 11B. Note that the operation waveform of the output voltage pulse Vout is higher in a low level than 0V by application of a DC bias, and corresponds to a response waveform represented by the solid line.

For example, a DC bias of 1.6V is applied as the Vl value. In a fall operation, the input voltage changes from a high-level voltage of 2.25V to a low-level voltage of 1.6V, and the voltage across Rs is 0.65V. The peak value of the discharge current reaches 65 mA. Although Vl is set as high as 1.6V, a large amount of current injection can be ensured, and the fall time is as short as about 1.5 ns, as will be described later.

On the other hand, the rise response changes stepwise from an input low-level voltage of 1.6V to a high-level voltage of 2.25V in pulse driving. The delay time td obtained by simulating the response waveform was 1.2 ns, and the rise time tr was 5.3 ns. As a result, the total time until the emission intensity reaches a steady-state value was 6.5 ns from the level change start of an input pulse, that was shorter by 2.5 ns as the shortened time of td than the response obtained when Vl in the initial state was set to 0V.

To further shorten the transient response time and realize optical transmission at a high bit rate, the following invention is effectively applied. That is, the voltage waveform in which the high level of a pulse in constant voltage pulse driving is held at a constant single value is replaced by a binary voltage waveform in which the high level value changes midway. The high level is first set to a higher voltage Vh2, and when the optical output reaches a desired intensity, returns to a steady-state level voltage Vh1=Vh. This binary voltage pulse is used for driving.

Figure 5:
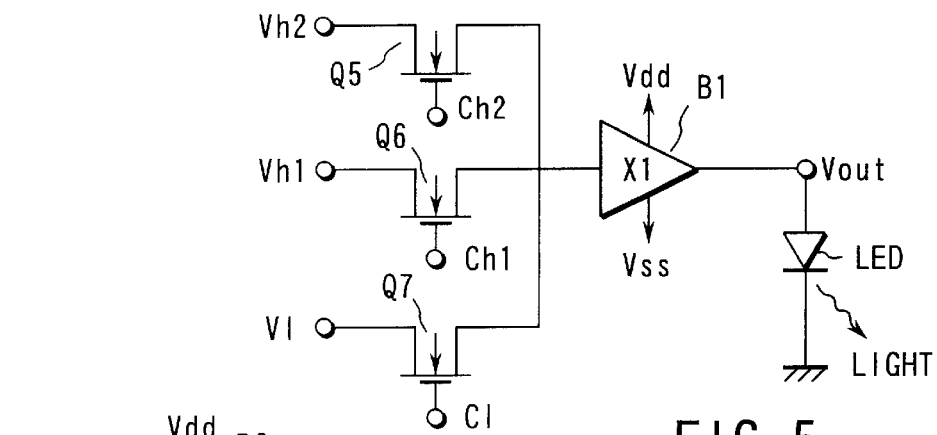
FIG. 5 is a circuit diagram showing an LED driving circuit for generating a binary voltage pulse by a small-signal MOS voltage switch, amplifying the pulse by a buffer, and outputting the amplified pulse.

The driving method of the present invention can also be singly applied. FIG. 5 is a block diagram showing an LED driving circuit for quantifying an operation of increasing the speed as much as possible.

The third embodiment concerns an LED driving circuit in which three reference voltages Vh2, Vh1, and Vl which define the pulse level are input and sequentially switched by small-signal MOS voltage switches Q5, Q6, and Q7, and a voltage pulse having two high level values is generated, amplified by a high-speed buffer, and output. The high-speed buffer amplifier at the output has already been described in detail by exemplifying the embodiments shown in FIGS. 7 to 9, and a description thereof will be omitted.

Figure 6:
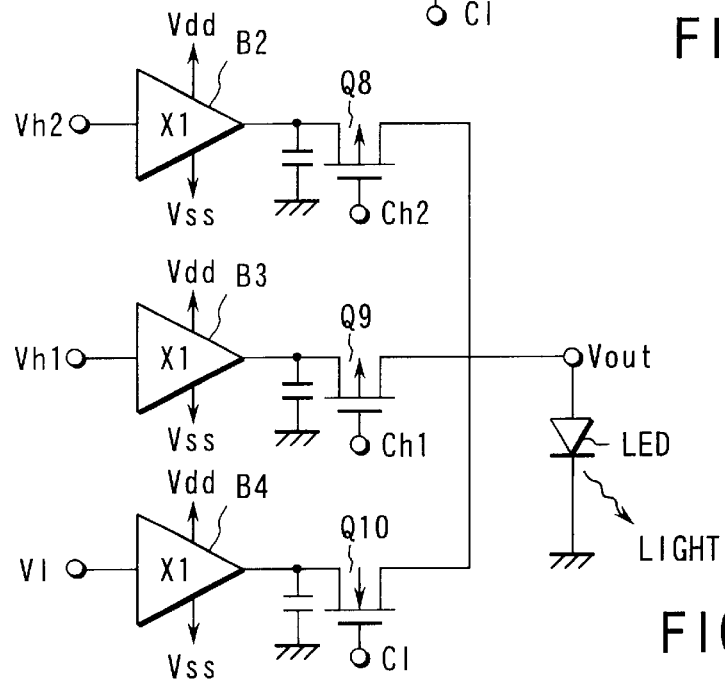
FIG. 6 is a circuit diagram showing an LED driving circuit for directly switching a buffer-amplified reference voltage by a MOS switch and generating a binary voltage pulse.

A circuit embodiment of another driving type using a voltage pulse having two high level values is the fourth embodiment of a circuit in FIG. 6 which is similar in circuit operation to the second embodiment of single rectangular pulse driving.

The fourth embodiment relates to an LED driving circuit in which input reference voltages Vh2, Vh1, and Vl are temporarily amplified by a buffer to enable connection to a large-current load, and these voltages are directly switched by MOS switches Q8, Q9, and Q10 to generate a binary voltage pulse.

Figure 12A:
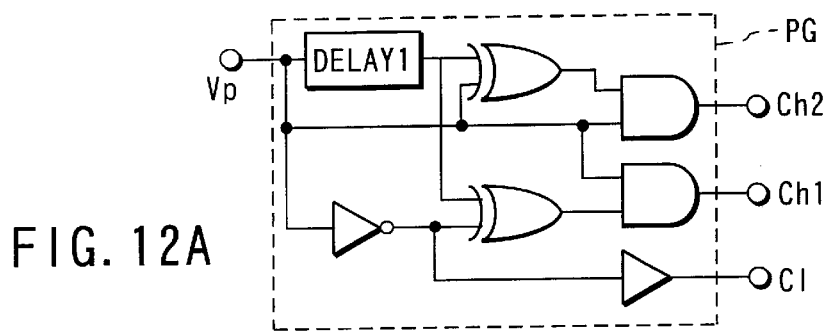
FIG. 12A is a circuit diagram showing the switch-controlled pulse generation logical circuit of a binary voltage pulse driving circuit.
Figure 12B:
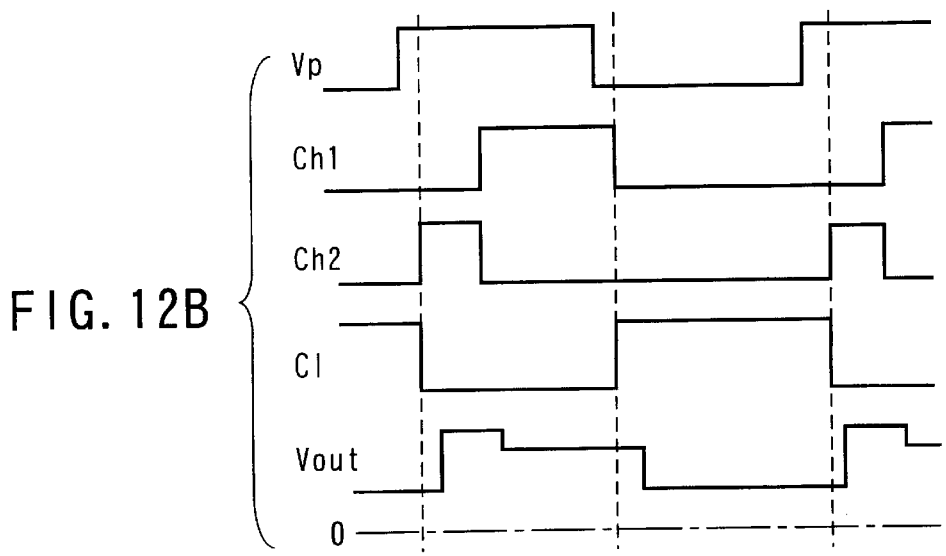
FIG. 12B is a waveform chart showing the timing waveform of the circuit in FIG. 12A.

The two types of binary voltage pulse driving circuits adopt the same switch control. A necessary pulse generation logic circuit, the timing waveforms of signals, and the waveform of the output voltage Vout are shown in FIGS. 12A and 12B.

The driving circuit for generating a binary voltage pulse switches a reference voltage source at each timing corresponding to a change in external input signal Vp, determines the pulse peak value, and shapes the pulse into a desired pulse shape. As another binary voltage pulse generation method, Vl may always be fixed as a reference, and the high level may be sequentially added as the difference from the reference voltage Vl.

Figure 14:
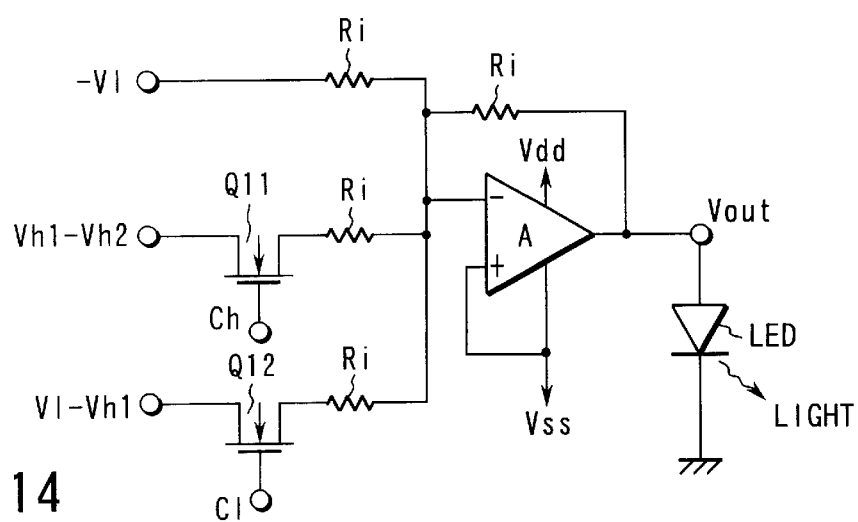
FIG. 14 is a circuit diagram showing the first embodiment of a voltage addition type LED driving circuit for generating a binary voltage pulse by a small-signal MOS voltage switch, amplifying the pulse by a buffer, and outputting the amplified pulse.

FIG. 14 shows the detailed circuit (fifth embodiment).

In this case, a reference voltage −Vl is inversely amplified, and the reference voltage of an output Vout is always fixed to Vl. Difference signal voltages (Vh1−Vh2) and (Vl−Vh1) are switched by turning on/off small-signal MOS voltage switches Q11 and Q12. At the start of high-level transition, (Vh1−Vh2) and (Vl=Vh1) are added to Vl to obtain Vout=Vh2. Then, Q11 is turned off to cut off the former, and the voltage returns to Vout=Vh1. When both Q11 and Q12 are off, the low level returns to only Vl.

As a result, a voltage pulse output having two high level values is obtained. The output of the LED driving circuit uses an inversion/synthesis buffer amplifier. In this method, an initial over drive voltage (Vh2−Vh1) in high-level transition of the voltage is input from the switch as a difference from the steady-state high-level voltage Vh1. This reduces reference voltage setting variations and errors, and suppresses variations in the response characteristics of an optical signal. However, all the externally input reference voltages must be negative values, and when the circuit operates with a single vdd power supply, reference voltages must be externally supplied.

The output buffer circuit basically requires a differential input amplifier circuit. The differential input amplifier circuit in the circuit shown in FIG. 8 or 9 can be directly used by separating the connection of directly feeding back an output voltage to the inverting input terminal.

To eliminate the necessity of the negative reference voltage source in the fifth embodiment, the circuit is constituted to be operable by a single power supply by using different voltage addition methods and only a positive reference voltage source.

Figure 15:
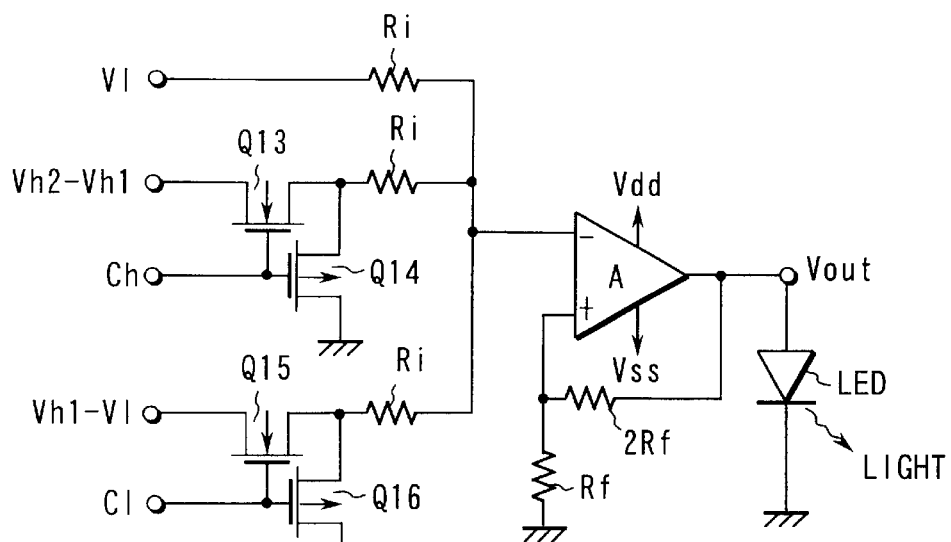
FIG. 15 is a circuit diagram showing the second embodiment of a voltage addition type LED driving circuit for generating a binary voltage pulse by a small-signal MOS voltage switch, amplifying the pulse by a buffer, and outputting the amplified pulse.

FIG. 15 shows the sixth embodiment of an LED driving circuit designed based on this gist.

In FIG. 15, two small-signal MOS voltage switches Q13 and Q14 and two small-signal MOS voltage switches Q15 and Q16 are attached to respective reference voltage signal lines to switch whether to input a reference voltage or to ground the line. This circuit is based on the circuit operation principle in which Vout is a voltage prepared by always adding and averaging a total of three voltages at a Vl input terminal and two input terminals after the switches.

Figure 16A:
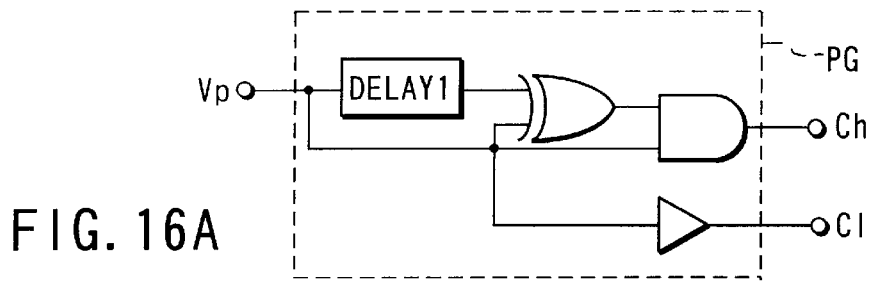
FIG. 16A is a circuit diagram showing the switch-controlled pulse generation logical circuit of a voltage addition type binary voltage pulse driving circuit.
Figure 16B:
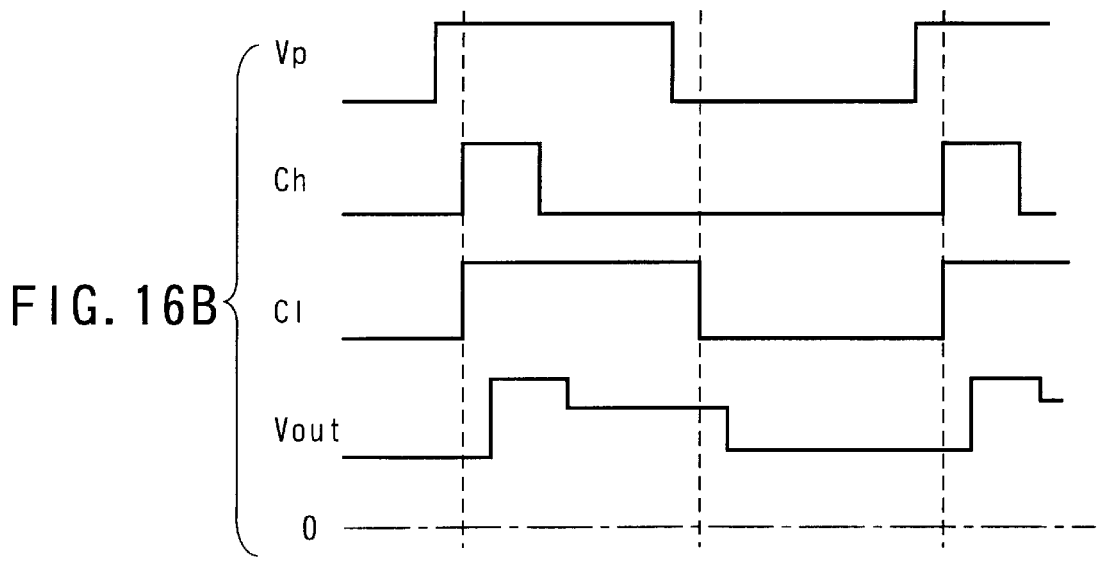
FIG. 16B is a waveform chart showing the timing waveform of the circuit in FIG. 16A.

A voltage pulse whose high level changes between two values is generated, amplified by a buffer, and output. Control of the binary voltage pulse driving circuit by the voltage addition methods in the fifth and sixth embodiments requires only two switch control pulses. The pulse generation logical circuit shown in FIG. 16A can be exploited to generate a desired control pulse. FIG. 16B shows the timing waveforms of respective signals and the waveform of the output voltage Vout at the same time.

The response waveform when the LED was driven by a voltage pulse having two high level values by using any one of the circuits in the third to sixth embodiments was quantitatively analyzed. When the initial peak voltage Vh2 at the pulse leading edge was set to 2.6V and the subsequent steady-state level voltage Vh1 was set to 2.25V, i.e., when the initial high level value at the pulse rise was set higher by 0.35V than the single-value peak voltage of 2.25V, the delay time was 0.71 ns and the rise time was 1.25 ns.

According to this driving method, the time until the emission intensity reached the steady-state value was greatly shortened to 1.96 ns. Note that the instantaneous peak current at the leading edge reached 100 mA, which is five times a steady-state driving current If of 20 mA. An impulse-shaped current of 100 mA is injected in transmitting a signal of an arbitrary pattern, and the circuit operation must be so designed as to cope with impulse operation. However, this value does not obstruct implementation.

In the first to sixth embodiments, the voltage changes stepwise from the voltage Vh=2.25V to Vl=1.6V in transition from a high level to a low level regardless of whether the high level of a constant voltage pulse takes a single or two values. The fall time of an optical output pulse at this time was checked to be 1.51 ns. This value is almost equal to a rise time of 1.25 ns in driving with a constant voltage pulse having two high level values, and indicates a transmission possibility of several hundred Mb/s.

If Vl is decreased to 0V, the fall time can be shortened to almost 0.5 ns, which results in unbalanced fall and rise times and does not contribute to an increase in speed. At the fall, the rise delay time with respect to an electrical pulse is only about 0.1 ns.

In the fourth to sixth embodiments, the delay time is shortened to about 0.7 ns, which cannot be ignored. The pulse width of an output optical signal including rise/fall correction is smaller by about 0.5 ns than the width of the externally input signal pulse Vp. If a high-speed element can be similarly used and either of the element constants Rs and Cd of the LED can be halved, the above-described LED driving circuit of the present invention can be applied to realize an optical data link having a maximum transfer rate of 500 Mb/s. The prospective pulse width narrowing amount at this time is 0.25 ns.

Even by applying any of the above means, the pulse narrowing phenomenon that the pulse width of an LED output optical signal decreases occurs more or less in principle. If this narrowing amount changes the duty ratio or appears as a time jitter in signal transmission, the pulse narrowing phenomenon can be prevented by applying the present invention of compensating for a high-pulse width by a pulse narrowing amount generated by the driving method. That is, a circuit of increasing the high-pulse width of an input signal by a pulse narrowing amount in advance is added to widen the LED driving voltage pulse.

The basic operation principle of a driving circuit for realizing this can be achieved by changing only the control pulse generation circuit in each of the circuits in the first to sixth embodiments. The function which should be included in the control pulse generation circuit is an operation function of generating a sequential pulse whose high-level pulse width is increased by the narrowing amount by using a combination of two delay circuits and a logic synthesis circuit at maximum on the basis of a pulse prepared by temporarily shaping an externally input signal waveform into an appropriate rectangular waveform. To sequentially select and switch a reference voltage on the basis of the sequential pulse at a desired timing and generate a voltage pulse having a low output impedance, the arrangement of the switch-controlled pulse generation logic circuit is changed in accordance with the voltage pulse generation method.

Figure 11A:
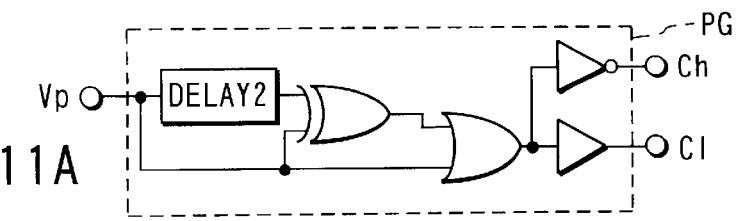
FIG. 11A is a circuit diagram showing the switch-controlled pulse generation logical circuit of a single-value rectangular pulse driving circuit which increases the pulse width.
Figure 11B:
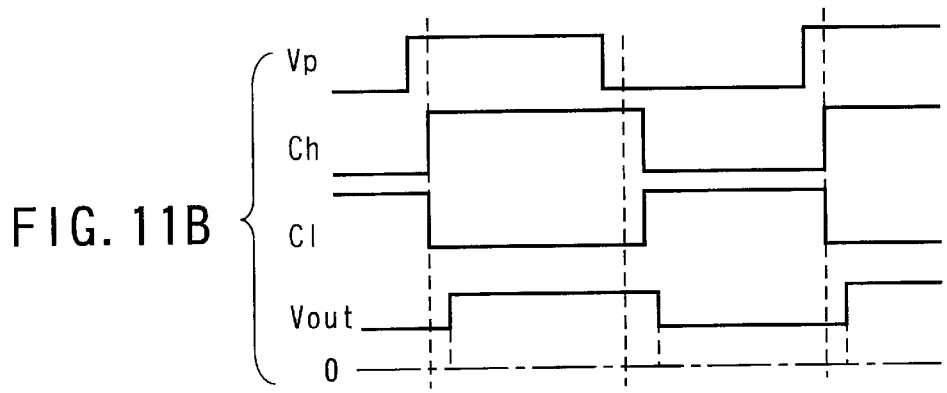
FIG. 11B is a waveform chart showing the timing waveform of the circuit in FIG. 11A.

The switch-controlled pulse generation logic circuit shown in FIG. 11A can be applied to the first and second embodiments which adopt the single-value rectangular pulse driving circuit method. FIG. 11B shows a detailed input signal pulse Vp, the sequence waveforms of control pulses Cl and Ch whose pulse widths are increased, and the waveform of the output voltage Vout.

Figure 13A:
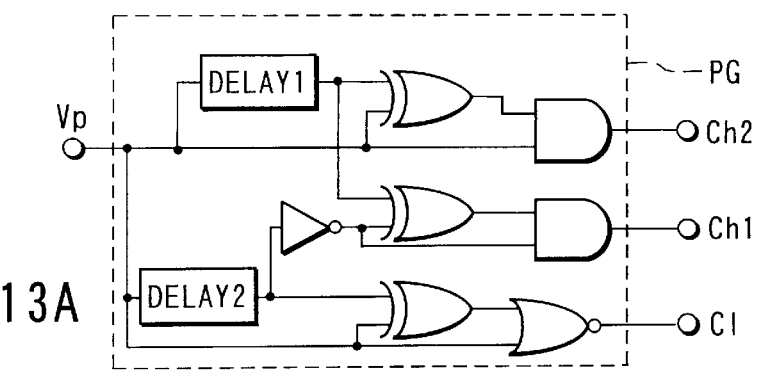
FIG. 13A is a circuit diagram showing the switch-controlled pulse generation logical circuit of a binary voltage pulse driving circuit which increases the pulse width.
Figure 13B:
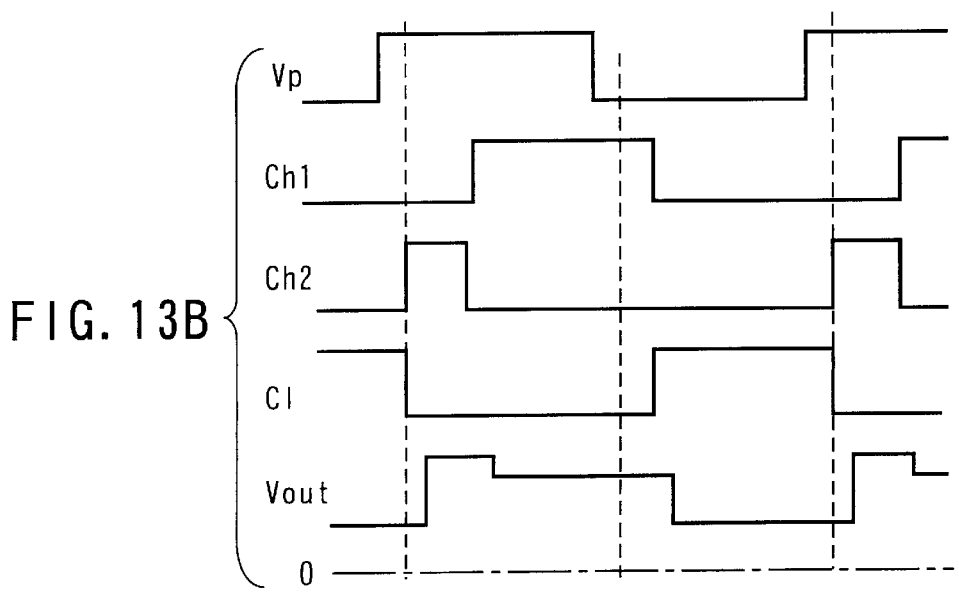
FIG. 13B is a waveform chart showing the timing waveform of the circuit in FIG. 13A.

FIG. 13A shows a switch-controlled pulse generation logic circuit using the binary voltage pulse driving circuit method that can be applied to the third and fourth embodiments. FIG. 13B shows the timing waveforms of various signals used in the circuit of FIG. 13A. The high-pulse width of the driving voltage pulse Vout is increased by a combination of Ch1 and Cl whose pulse widths are increased and Ch2 whose pulse width is kept unchanged.

Figure 17A:
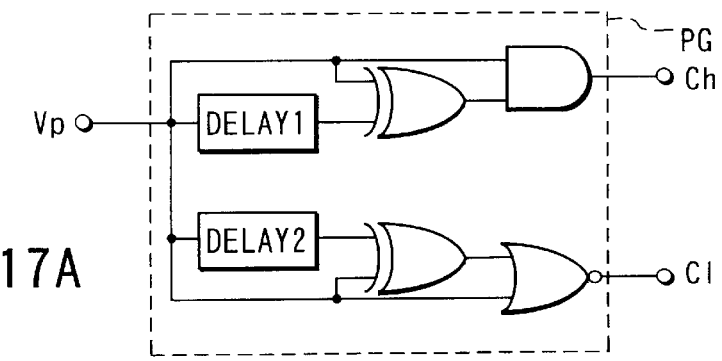
FIG. 17A is a circuit diagram showing the switch-controlled pulse generation logical circuit of a voltage addition type binary voltage pulse driving circuit which increases the pulse width.
Figure 17B:
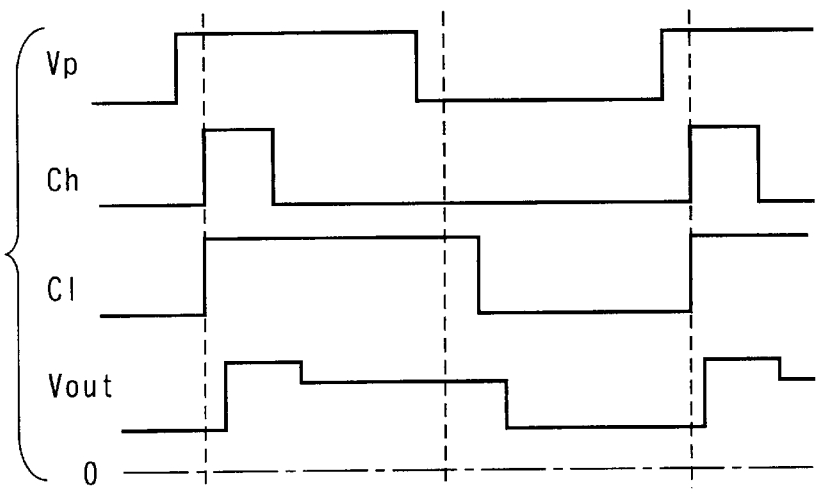
FIG. 17B is a waveform chart showing the timing waveform of the circuit in FIG. 17A.

FIGS. 17A and 17B show a switch-controlled pulse generation logic circuit and the timing waveforms of signals which can be applied to the fifth and sixth embodiments that employ the same binary voltage pulse driving method but different circuit arrangements. The pulse width of only the control pulse Cl is increased without changing that of the control pulse Ch, thus obtaining the driving voltage pulse Vout whose high-pulse width is increased.

In the fourth to sixth embodiments, the narrowing amount of the high-level width is 0.5 ns, so that the optical value of the pulse width increase to be set in the logical synthesis circuit is 0.5 ns. In many high-speed LED driving circuits, the narrowing amount can be satisfactorily compensated for by substantially increasing the pulse width by 2 ns or less. The signal delay circuit necessary for the pulse width increase can be small in circuit size, and can be compactly assembled in an IC chip. The LED driving circuit itself can be assembled in a small-size one-chip IC.

The detailed numerical results of the transient response characteristics described above are obtained at the relatively large capacitance Cd=200 pF and the series resistance Rs=10 Ω as LED element parameters. These results become smaller in proportion to a smaller capacitance Cd value of the LED or a smaller series resistance RS value of the LED. Depending on the selection of the element characteristics of the LED, the LED driving circuit can be applied to realize an optical data link having a transmission rate up to about 500 Mb/s. The LED driving circuit of the present invention can realize a sub-Gbit-rate optical data link using an LED with a minimum increase in power consumption and low cost.

Figure 28:
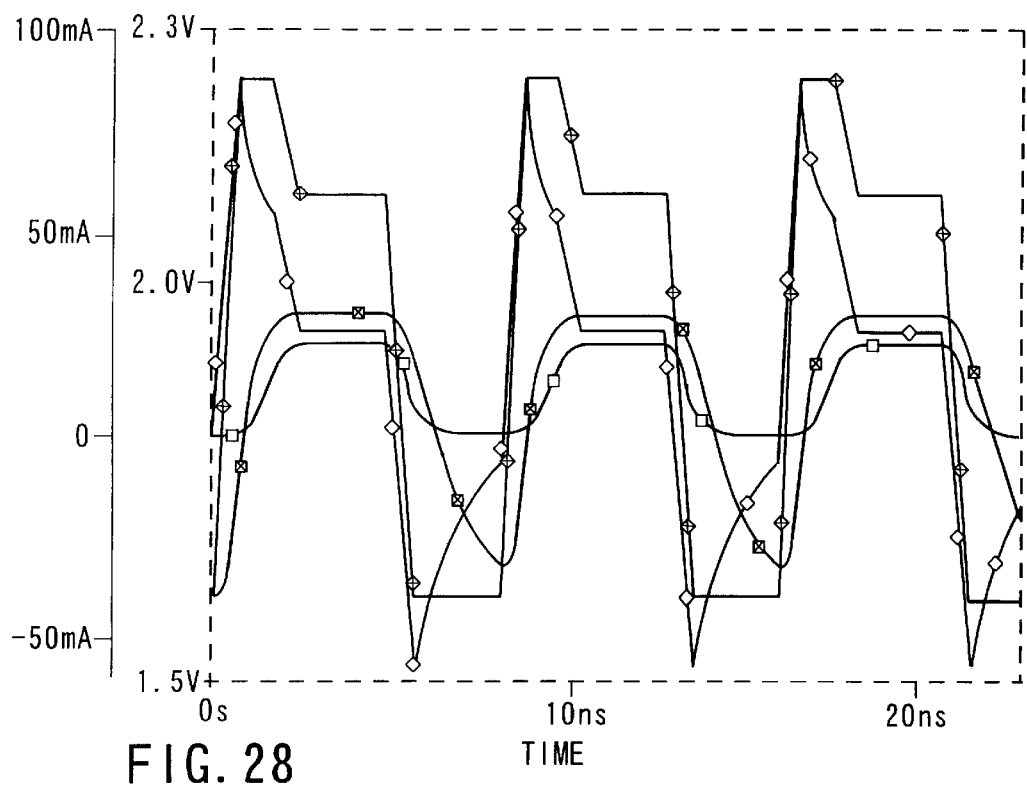
FIG. 28 is a graph showing an example of a voltage/current operation waveform and output optical signal waveform by a binary voltage pulse driving method.

FIG. 28 shows the results of analyzing the voltage/current operation waveform and output optical signal waveform of an LED in binary voltage pulse driving by using an actual LED diode model described by full parameters almost similar to the electrical characteristics of the LED employed as a typical example.

More specifically, FIG. 28 shows characteristics for a repetitive signal of 250 Mb/s. Voltage level values input to the LED are Vl=1.6V, Vh2=2.25V, and Vh1=2.10V, the rise and fall times of a driving pulse are 0.6 ns, and the high-pulse width increase time is 0.8 ns. Although a finite transient response pulse different from an ideal rectangular pulse suppresses the peak current in a transient response, the optical output waveform attains a proper pulse shape which keeps a duty ratio of 2:1. It can be easily estimated that transmission at 500 Mb/s or more is enabled by exchanging the LED for one improved in characteristics so as to cope with high speed, and optimizing driving conditions.

The above description is based on room temperature. Measurements upon a temperature change will be explained.

A red LED has a larger band gap than that of an Si diode, but is essentially a diode. A forward voltage Vf necessary for flowing a forward current of a predetermined value has a large temperature dependence unique to the diode upon a change in operation temperature, similar to the Si diode.

As described above, when the voltage drop at Rs by a current flowing through an ideal diode can be ignored, only the activation ratio N is a parameter which determines the magnitude of the temperature dependence regardless of the element material. N depends on the device, and when a current necessary for emission of the LED actually flows, the diode is in an operation region where the voltage drop at Rs cannot be ignored. From this, the diode behaves out of a simple ideal operation state. By selecting operation conditions, the temperature dependence of the LED exhibits almost the same characteristic as that of the Si diode. Even if their characteristics are different, the difference falls within several tens of %.

To maintain a current flowing through the LED at a given value regardless of temperature change, the driving voltage level Vf applied to the current is made to follow the temperature change. In other words, a circuit is so designed as to be able to always generate, controlled low-level voltage Vl of the DC bias voltage which guarantees high-speed operation of the LED and Vh which determines an optical output intensity, following a temperature change in the forward voltage of the LED.

Figure 18:
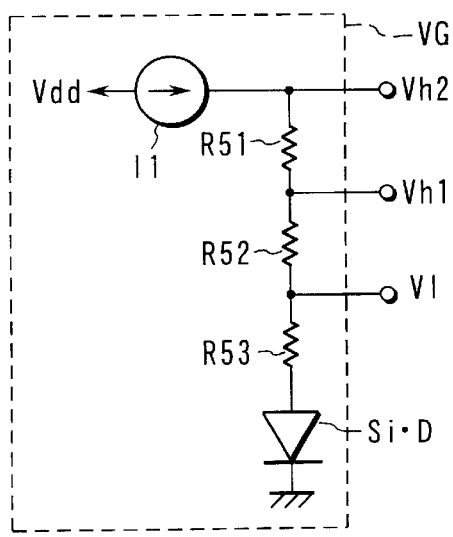
FIG. 18 is a circuit diagram showing a temperature-compensated reference voltage generation circuit using a constant current generation source and Si diode.
Figure 19:
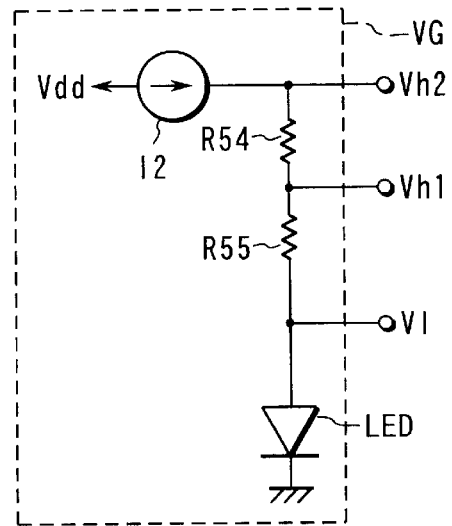
FIG. 19 is a circuit diagram showing a temperature-compensated reference voltage generation circuit using a constant current generation source and reference LED.
Figure 20:
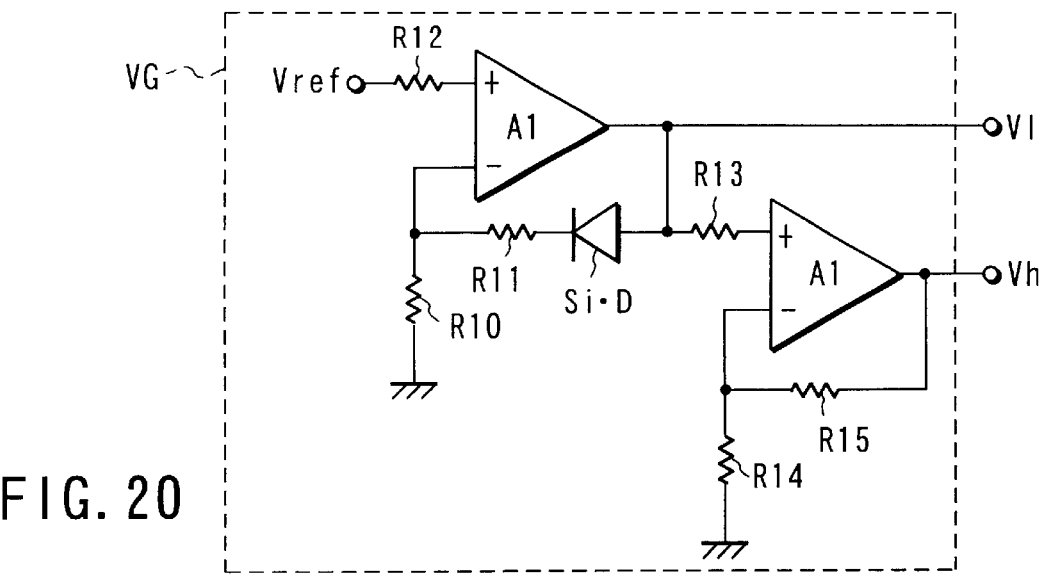
FIG. 20 is a circuit diagram showing a temperature-compensated reference voltage generation circuit for generating an amplitude-controlled rectangular voltage pulse by using a constant voltage reference power supply and Si diode.

FIGS. 18 to 20 show detailed examples of the basic arrangement of a reference voltage generation circuit which matches this purpose.

In FIG. 18, a stabilization constant current source I1 using a band gap reference voltage as a reference is used to generate a DC current independent of the temperature. Resistors R51, R52, and R53 and an Si diode Si·D having forward voltage dependence corresponding to the temperature change amount of the LED are selected and cascade-connected to obtain three reference voltages Vl, Vh1, and Vh2. The resistance value can be uniquely determined by a DC current value in use, a corresponding forward voltage of Si·D, and three reference voltages to be generated.

In FIG. 19, the reference voltage generation circuit is used for direct reference voltage generation of an LED having the same characteristics as those of an LED used for photoelectric conversion. In this case, a DC current generated by a constant current source I1 is set equal to a current flowing for a low-level signal when the LED is OFF. The resistance values of R54 and R55 are determined to generate voltage differences (Vh1-Vl) and (Vh2-V2) on the basis of the current value.

These circuits are simple because only one stabilization constant current source and an element having the same temperature dependence as that of an LED are prepared. However, the output impedance of a reference voltage output is relatively high, and a resistance value which increases from ground must be adjusted.

Figure 23:
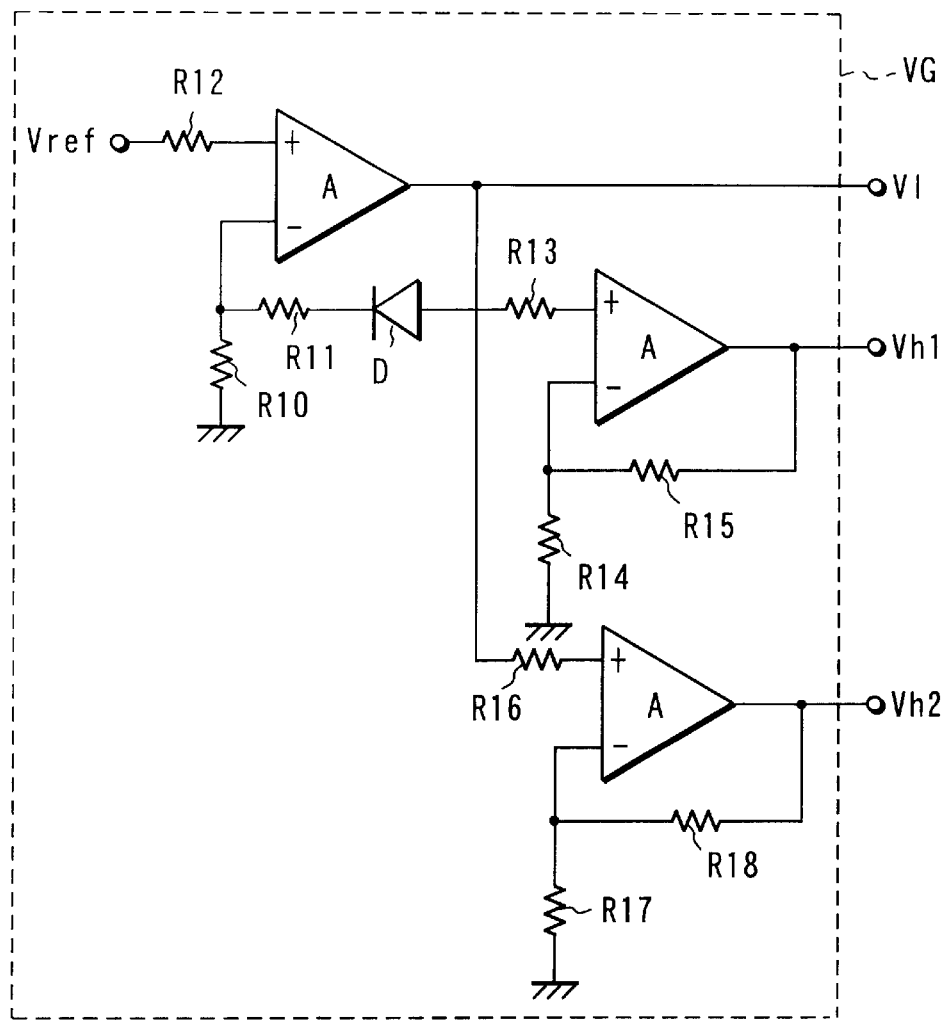
FIG. 23 is a circuit diagram showing a temperature-compensated reference voltage generation circuit for generating an amplitude-controlled binary voltage pulse by using a constant voltage reference power supply and Si diode.

The embodiment of FIG. 20 concerns a circuit using an Si·D element having a stabilization reference voltage Vref and the same temperature dependence as that of an LED, and two feedback amplifiers which need not have very-high-frequency characteristics. A bias current flowing through Si·D is given by Vref/R10. The circuit temporarily generates Vl and then generates Vh based on Vl. In this case, the output voltages Vl and Vh can be respectively adjusted by grounded R10 and R14, and the circuit can be easily changed in structure to adjust Vl and Vh from the outside of the IC. To generate a voltage Vh2, a circuit identical to one for generating Vh1=Vh is added. This embodiment is shown in FIG. 23.

Figure 21:
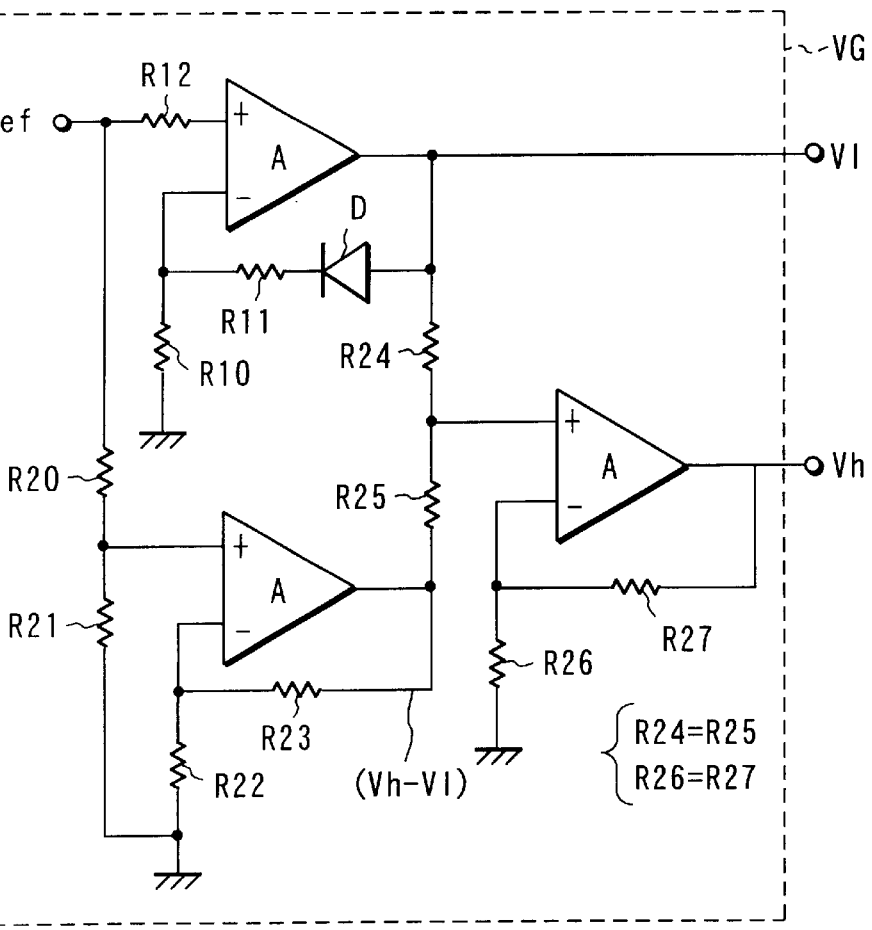
FIG. 21 is a circuit diagram showing a temperature-compensated reference voltage generation circuit for generating a fixed-amplitude rectangular voltage pulse by using a constant voltage reference power supply and Si diode.

In general, the emission efficiency of an LED has a negative temperature coefficient. As for the control of Vh, a positive temperature coefficient can be substantially set to a high current value with respect to a temperature change by setting the temperature coefficient smaller than Vf, and a decrease in optical output pulse amplitude along with temperature rise can also be compensated for. FIG. 21 shows an embodiment having this function as a modification of the embodiment in FIG. 20.

A stabilization voltage is temporarily generated to meet a voltage difference (Vh−Vl) at room temperature, and the sum of the stabilization voltage and Vl is calculated to generate Vh. Note that Vh is a voltage having a predetermined voltage difference from Vl independently of the temperature. To generate Vh2 together with Vh1=Vh, a circuit identical to the Vh generation circuit is added.

Each of the above-described circuits uses a single LED for a voltage reference, or selects an Si diode having the same radiation coefficient N as that of the LED and uses the Si diode for a voltage reference. The circuit generates the reference voltages Vl, and Vh or Vh1 and Vh2 while compensating for temperature dependence. To complete the Si diode by only the process of manufacturing an LED driving circuit IC, a change in the forward voltage of the Si diode in the process is properly amplified to make the temperature coefficient of the Si diode coincide with that of the LED, and a DC voltage offset is synthesized by a shortage of the forward voltage to make the characteristics of the Si diode coincide with those of the LED because the temperature change of the Si diode is often slightly smaller than the temperature change of the LED and the forward voltage of the LED is higher.

Figure 22:
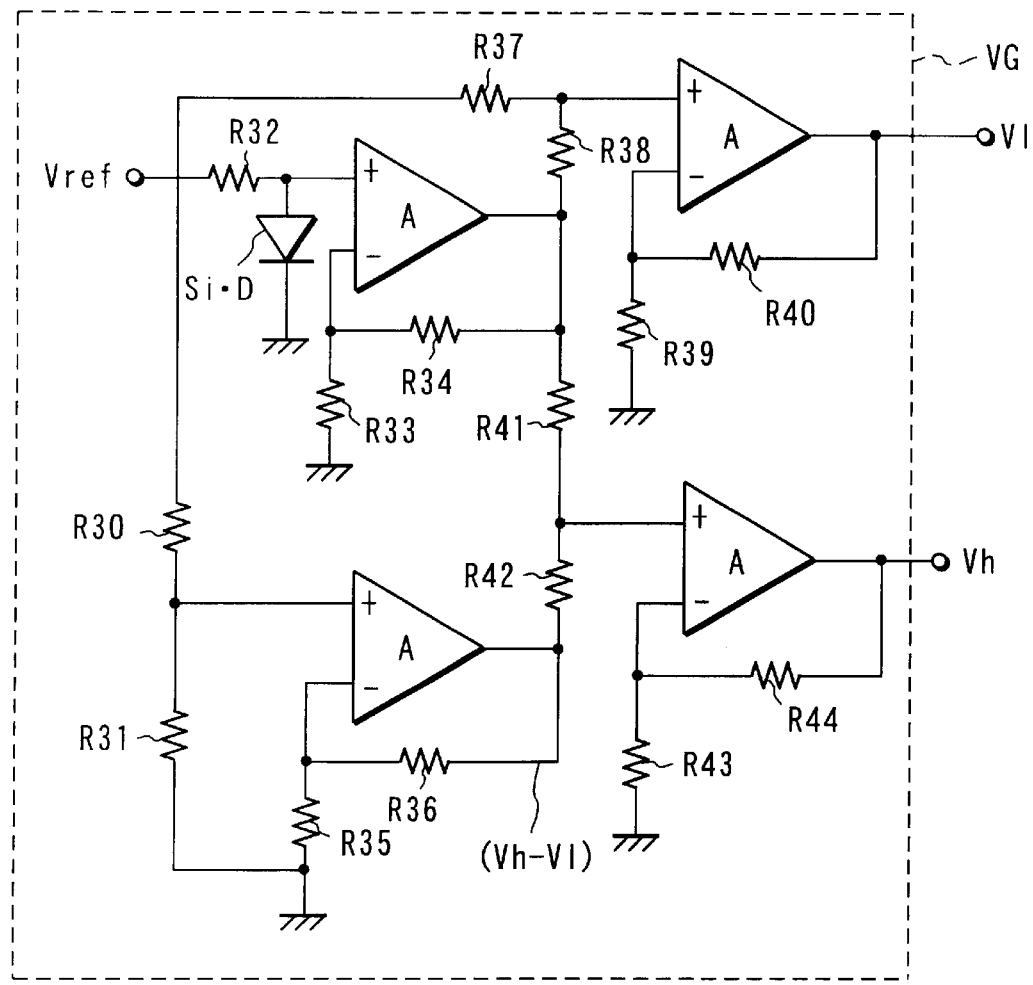
FIG. 22 is a circuit diagram showing a temperature-compensated reference voltage generation circuit which uses a constant voltage reference power supply and Si diode, can adjust the activation ratio, and generates a fixed-amplitude rectangular voltage pulse.

FIG. 22 shows a circuit example which implements this.

After the forward voltage of Si·D is properly amplified, a DC offset of a predetermined voltage is added to generate Vl and Vh.

The method of fixing circuit constants in the IC cannot cope with flexible applications to various LEDs in order to use the LED driving circuit as a general-purpose component. In this case, temperature characteristic data of the forward voltage of a diode in the IC process which uses temperature characteristic data of an LED used in an EEPROM are written/held, the forward voltage of the Si diode on the IC substrate is converted into EEPROM address data by an A/D converter, and output data from the EEPROM is input to a D/A converter to generate a follow-up voltage.

Figure 27:
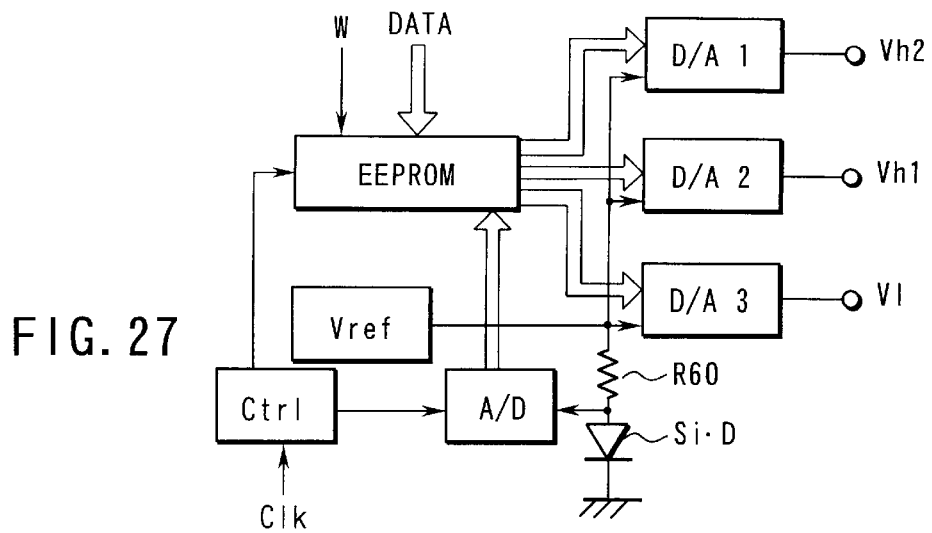
FIG. 27 is a block diagram showing a temperature-compensated reference voltage generation circuit constituted by a combination of an EEPROM and D/A converters.

The block diagram of this is a temperature-compensated reference voltage generation circuit constituted by a combination of an EEPROM and D/A converters shown in FIG. 27. Write data Data is written in the EEPROM in advance under the control of a terminal W. In operation, digital data to three D/A converters are refreshed by a control circuit Ctrl at a timing based on the internal clock of an LED driver circuit or an externally input clock Clk.

Although not shown in the drawings of this specification, an intensity monitor photodetector is arranged near the LED as a means for more positively keeping an optical signal constant, and a feedback circuit for controlling the voltage of a driving voltage pulse so as to maintain the average output of the intensity monitor signal at a predetermined value is arranged. With this arrangement, the quality of a transmission optical signal upon a temperature change can be kept more constant. This arrangement can also compensate for characteristic degradation along with a change of the LED over time.

The LED driving circuit according to the present invention has been exemplified.

An optical transmitting/receiving module according to the present invention will be described.

Figure 29:
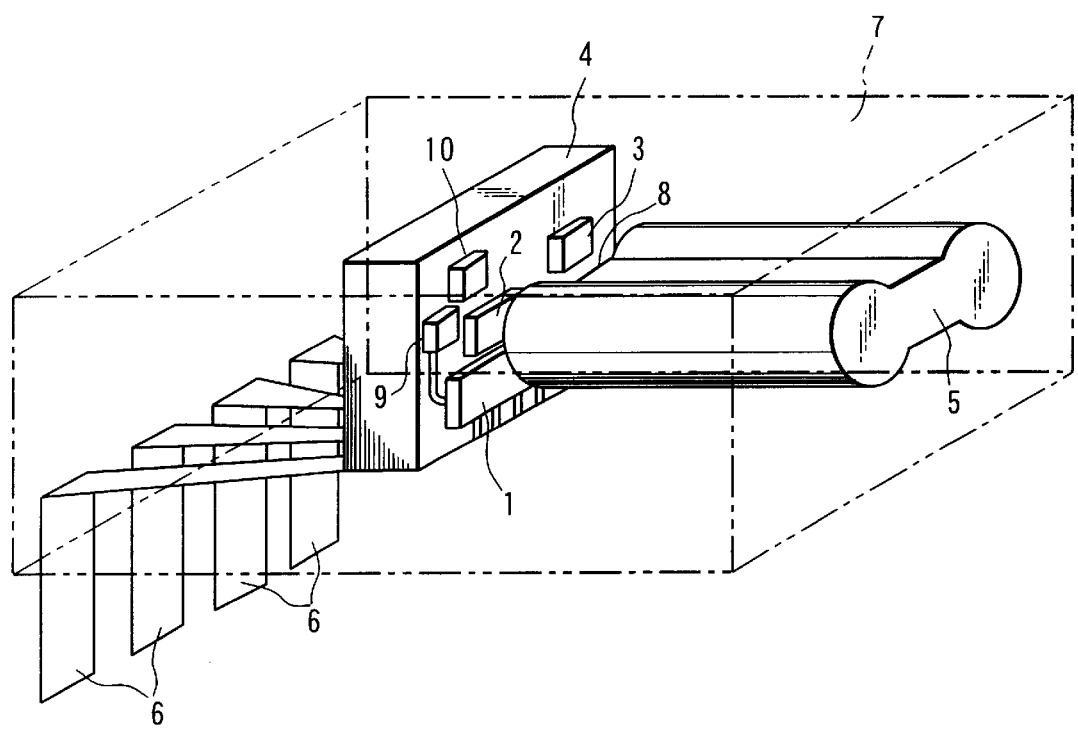
FIG. 29 is a perspective view showing an optical connector-coupled optical transmitting module in which a one-chip IC manufactured based on the present invention is mounted.

FIG. 29 is a perspective view showing the schematic arrangement of the main part of the optical transmitting/receiving module according to the present invention.

The use of the above-described driving circuit can implement a transmitting module which can perform high-speed modulation for an LED essentially having a large junction capacitance, is small in pulse waveform distortion, and can cope with a low-voltage power supply with low power consumption. The module shown in FIG. 29 comprises an IC 1 in which the LED driving circuit of the present invention is assembled, an LED element 2, and a capacitor 9 and resistor 10 accessory to operating the module. These components are mounted at once as a submodule on a submodule substrate 4 or plastic mold lead frame.

The module has a molded optical connector 5 in order to couple an LED on the module to an optical waveguide such as a plastic fiber. Leads 6 for electrically coupling the module to the outside are attached to one end of the module. The module is molded by a plastic package 7.

In FIG. 29, the leads are attached to only one end of the module. However, lead-attaching portions can be appropriately selected, and leads may be attached to the other end of the package. Further, leads for ensuring the mechanical strength in mounting the module on a printed board may be attached. A transceiver module structure constituted by mounting a receiving module parallel to the transmitting module and integrating them also falls within the spirit and scope of the present invention.

FIG. 29 shows an example of the optical transmitting/ receiving module which incorporates a photodetector 3 and reception IC 8. The present invention can implement a compact optical connector-coupled plastic transmitting module or optical transmitting/receiving module which operates by a single power supply with low power consumption and can be used in a normal heat dissipation design.

The embodiments of the optical element driving circuit of the present invention using the Bi-CMOS process have been described. However, the present invention is not limited to them. For example, the circuit must be modified in accordance with the characteristics of a transistor element adopted to constitute a concrete circuit. Even when a transistor element other than a Bi-CMOS, such as an Si bipolar transistor or CMOS element is applied, an optical semiconductor element driving circuit which operates similarly in principle is implemented without departing from the spirit and scope of the present invention.

According to the present invention, high-speed modulation is realized by using an LED which cannot be driven at a high speed in the prior art. The distortion of an output optical pulse waveform can be reduced, an increase in power consumption can be minimized, and all circuits can be mounted compactly in an IC. The present invention can implement an LED driving circuit which can be easily assembled in a one-chip IC and can operate even on a low-voltage power supply.

As a result, the present invention can provide a compact optical connector-coupled plastic optical transmitting module which operates at low power consumption on a power supply voltage from a single power supply shared by another signal processing IC and can be used in a normal heat dissipation design.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An LED driving circuit comprising:
a pulse generation circuit for shaping a waveform of an externally input signal and generating first and second pulses having a complementary relationship;
a first voltage transfer circuit for applying to an LED a first output voltage of a low level on the basis of the first pulse, and
a second voltage transfer circuit for applying to the LED a second output voltage of a high level on the basis of the second pulse,
wherein the high level is substantially equal to a froward voltage for generating a forward peak current of the LED necessary for outputting light of a predetermined intensity from the LED,
the low level is substantially equal to a voltage for changing an emission intensity of the LED to zero or a negligible value, and
a real part of an output impedance of said pulse generation circuit is smaller than an internal series resistance of the LED.

2. A circuit according to claim 1, wherein
the low level is not more than a voltage necessary for generating a forward diode current having a value obtained by dividing the forward peak current of the LED by an extinction ratio of the LED, and is not less than a forward voltage at which low level of an optical signal generated in transferring a maximum repetitive signal is not more than twice a low level of an optical signal generated in low-speed transmission, and
the LED always receives a predetermined pre-bias voltage higher than 0V.

3. A circuit according to claim 1, wherein the low and high levels change following an operation temperature of the LED so as to always keep a forward current flowing through the LED constant even when the operation temperature of the LED changes.

4. A circuit according to claim 1, further comprising a third voltage transfer circuit for applying to the LED a third output voltage on the basis of the third pulse,
wherein said pulse generation circuit generates the third pulse, a high level of the third output voltage is higher than the high level of the second voltage, and a difference between the high levels of the second and third output voltages is not more than 1V, and a period of the high level of the third output voltage is not more than 5 us and is not more than a pulse width of the third pulse.

5. A circuit according to claim 1, wherein a pulse width of an output pulse for driving the LED is shaped to be equal to a pulse width of the first pulse or the second pulse, and
a period of the high level of the output pulse is not more than 2 ns.

6. A circuit according to claim 1, wherein
an output pulse for driving the LED has an amplitude overshoot of not less than 20% a complete rectangular shape in transition, and
a pulse width of the output pulse is equal to a pulse width of the first pulse or the second pulse, not more than 3 ns.

7. A circuit according to claim 1, further comprising:
a photodetector for monitoring an emission intensity of the LED; and
a circuit for adjusting an amplitude of the output pulse for driving the LED so as to keep the average emission intensity of the LED constant.

8. An LED driving circuit comprising:
a voltage generation circuit for generating a first output voltage of a low level and a second output voltage of a high level;
a first MOS switch for transferring the first output voltage to an output terminal;
a second MOS switch for transferring the second output voltage to the output terminal; and
a pulse generation circuit for shaping a waveform of an externally input signal and generating first and second rectangular pulses having a complementary relationship,
wherein an LED is electrically connected to the output terminal,
the first rectangular pulse is input to a gate of said first MOS switch,
the second rectangular pulse is input to a gate of said second MOS switch,
the high level is determined by a forward peak current or forward voltage of the LED which is necessary for outputting light of a predetermined intensity from the LED, and
the low level is set to a voltage value for changing an emission intensity of the LED to zero or a negligible value.

9. A circuit according to claim 8, wherein a buffer is connected between said first and second MOS switches and the output terminal.

10. A circuit according to claim 8, wherein
the first output voltage is input to said first MOS switch via a first buffer, and
the second output voltage is input to said second MOS switch via a second buffer.

11. A circuit according to claim 8, wherein the low level is set to a voltage value not more than a voltage necessary for generating a forward diode current having a value obtained by dividing the forward peak current of the LED by an extinction ratio of the LED.

12. A circuit according to claim 8, wherein an
intensity of light generated by the LED in operation at a maximum frequency is set to be not more than twice an intensity of light generated by the LED in operation at a normal frequency.

13. A circuit according to claim 8, wherein the LED always receives a predetermined voltage higher than 0V as a DC pre-bias.

14. A circuit according to claim 8, further comprising a control circuit for changing a forward bias voltage of the LED following variations in operation temperature so as to maintain the forward current flowing through the LED at a constant value when the operation temperature of the LED changes.

15. A circuit according to claim 8, wherein
a rectangular pulse output from said pulse generation circuit has an amplitude overshoot characteristic of not less than 20% in transition, and
a pulse width of the rectangular pulse is equal to a pulse width of the externally input signal or not more than 3 ns.

16. A circuit according to claim 8, further comprising:
a photodetector arranged near the LED to monitor an emission intensity; and
an adjustment circuit for adjusting amplitudes of the first and second rectangular pulses output from said pulse generation circuit so as to keep an average of the emission intensity constant.

17. An LED driving circuit comprising:

a voltage generation circuit for generating a first output voltage of low level, a second output voltage of first high level, and a third output voltage of second high level which is higher than the first high level;

a first MOS switch for transferring the first output voltage to an output terminal;

a second MOS switch for transferring the second output voltage to the output terminal;

a third MOS switch for transferring the third output voltage to the output terminal; and a pulse generation circuit for shaping a waveform of an externally input signal and generating first, second, and third rectangular pulses, wherein an LED is electrically connected to the output terminal, the first rectangular pulse is input to a gate of said first MOS switch, the second rectangular pulse is input to a gate of said second MOS switch, the third rectangular pulse is input to a gate of said third MOS switch, after the third rectangular pulse changes to high level, the second rectangular pulse successively changes to a high level, a level of the first rectangular pulse has a complementary relationship with a level (ORed level) obtained by ORing the second and third rectangular pulses, and a high-level voltage applied to the LED is binary.

18. A circuit according to claim 17, wherein a buffer is connected between said first, second, and third MOS switches and the output terminal.

19. A circuit according to claim 17, wherein the first output voltage is input to said first MOS switch via a first buffer, the second output voltage is input to said second MOS switch via a second buffer, and the third output voltage is input to said third MOS switch via a third buffer.

20. A circuit according to claim 17, wherein the low level is set to a voltage value not more than a voltage necessary for generating a forward diode current having a value obtained by dividing the forward peak current of the LED by an extinction ratio of the LED.

21. A circuit according to claim 17, wherein an intensity of light generated by the LED in operation at a maximum frequency is set to be not more than twice an intensity of light generated by the LED in operation at a normal frequency.

22. A circuit according to claim 17, wherein the LED always receives a predetermined voltage higher than 0V as a DC pre-bias.

23. A circuit according to claim 17, further comprising a control circuit for changing a forward bias voltage of the LED following variations in operation temperature so as to maintain the forward current flowing through the LED at a constant value when the operation temperature of the LED changes.

24. A circuit according to claim 17, wherein a high-level voltage pulse for driving the LED is set to the second high level during a predetermined period immediately after rise of the voltage pulse, and to the first high level during a remaining period, and high levels of the first to third rectangular pulses are set to the same value as the second high level.

25. A circuit according to claim 17, wherein a voltage difference between the first and second high levels is not more than 1V, the third output voltage of the second high level is kept output for a period of not more than 5 ns, and the third output voltage is smaller in amplitude and width than the third rectangular pulse.

26. A circuit according to claim 17, wherein a rectangular pulse output from said pulse generation circuit has an amplitude overshoot characteristic of not less than 20% in transition, and a pulse width of the rectangular pulse is equal to a pulse width of the externally input signal or not more than 3 ns.

27. A circuit according to claim 17, further comprising:

a photodetector arranged near the LED to monitor an emission intensity; and an adjustment circuit for adjusting amplitudes of the first and second rectangular pulses output from said pulse generation circuit so as to keep an average of the emission intensity constant.

28. An optical transmitting module comprising:

an IC having the LED driving circuit defined in any one of claim 1, 8, or 17;

an LED connected to an output terminal of the LED driving circuit;

a submodule on which said IC and said LED are mounted;

an optical connector which is optically coupled to said LED;

a lead which is electrically coupled to said IC and said LED; and a package for housing said IC, said LED, said submodule, said optical connector, and said lead.

* * * * *